United States Patent [19]
Hiramatsu et al.

[11] Patent Number: 5,789,569
[45] Date of Patent: Aug. 4, 1998

[54] ISOTHIOCYANATED CYCLODEXTRIN DERIVATIVE

[75] Inventors: Mitsuo Hiramatsu; Hiroshi Satozono; Tomomi Suzuki; Yasuhiro Mizusawa, all of Hamakita, Japan

[73] Assignee: Laboratory of Molecular Biophotonics, Shizuoka, Japan

[21] Appl. No.: 675,961

[22] Filed: Jul. 5, 1996

[30] Foreign Application Priority Data

Jul. 8, 1995 [JP] Japan ................... 7-204964
Jul. 1, 1996 [JP] Japan ................... 8-170972

[51] Int. Cl.$^6$ ................................. C08B 30/18
[52] U.S. Cl. ............................ 536/46; 536/103
[58] Field of Search ..................... 536/46, 103

[56] References Cited

PUBLICATIONS

Wang et al., "Photoreactive $^{111}$ In–Cyclodextrin Inclusion Complex: a New Heterobifunctional Reagent for Antibody Labeling", Nucl. Med. Biol., vol. 19, No. 8, 1992, pp. 897–902.
Brown et al., "Synthesis and Properties of $6^A$–Amino–$6^A$–deoxy–α–and –β–cyclodextrin", Aust. J. Chem., vol. 46, 1993, pp. 953–958.
Melton et al., "Synthesis of Monosubstituted Cyclohexaamyloses", Carbohydrate Research, vol. 18, 1971, pp. 29–37.
Smith et al., "Photochemistry of 6–Propyl–2–cyclohexenone", Journal of Organic Chemistry, vol. 37, No. 8, Apr. 21, 1972, pp. 1259–1262.
Marvel et al., "n–Dodecyl (Lauryl) p–Toluenesulfonate", Organic Syntheses, vol. 20, 1940, pp. 50–51.
Ackerman et al., "A New Synthesis of 5–Phenyl–2,3–dihydro–and 2,3,4,5–Tetrahydro–1H–2–benzazepin–1–ones", Canadian Journal of Chemistry, vol. 50, No. 23, Dec. 1, 1972, pp. 3886–3891.

*Primary Examiner*—Elli Peselev
*Attorney, Agent, or Firm*—Leydig, Voit & Mayer, Ltd.

[57] ABSTRACT

The present invention relates to an isothiocyanated cyclodextrin derivative which can label various kinds of organic compounds containing an amino group as their functional group. In some embodiments, the derivative can be a cyclodextrin derivative in which at least one primary hydroxyl group is substituted by an isothiocyanato group and expressed by the compound expressed by formula (I),

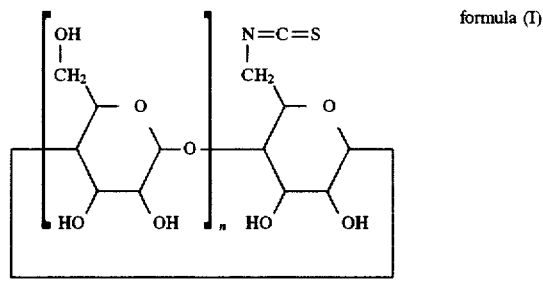

formula (I)

wherein n is an integer from 5 to 7.

4 Claims, 32 Drawing Sheets

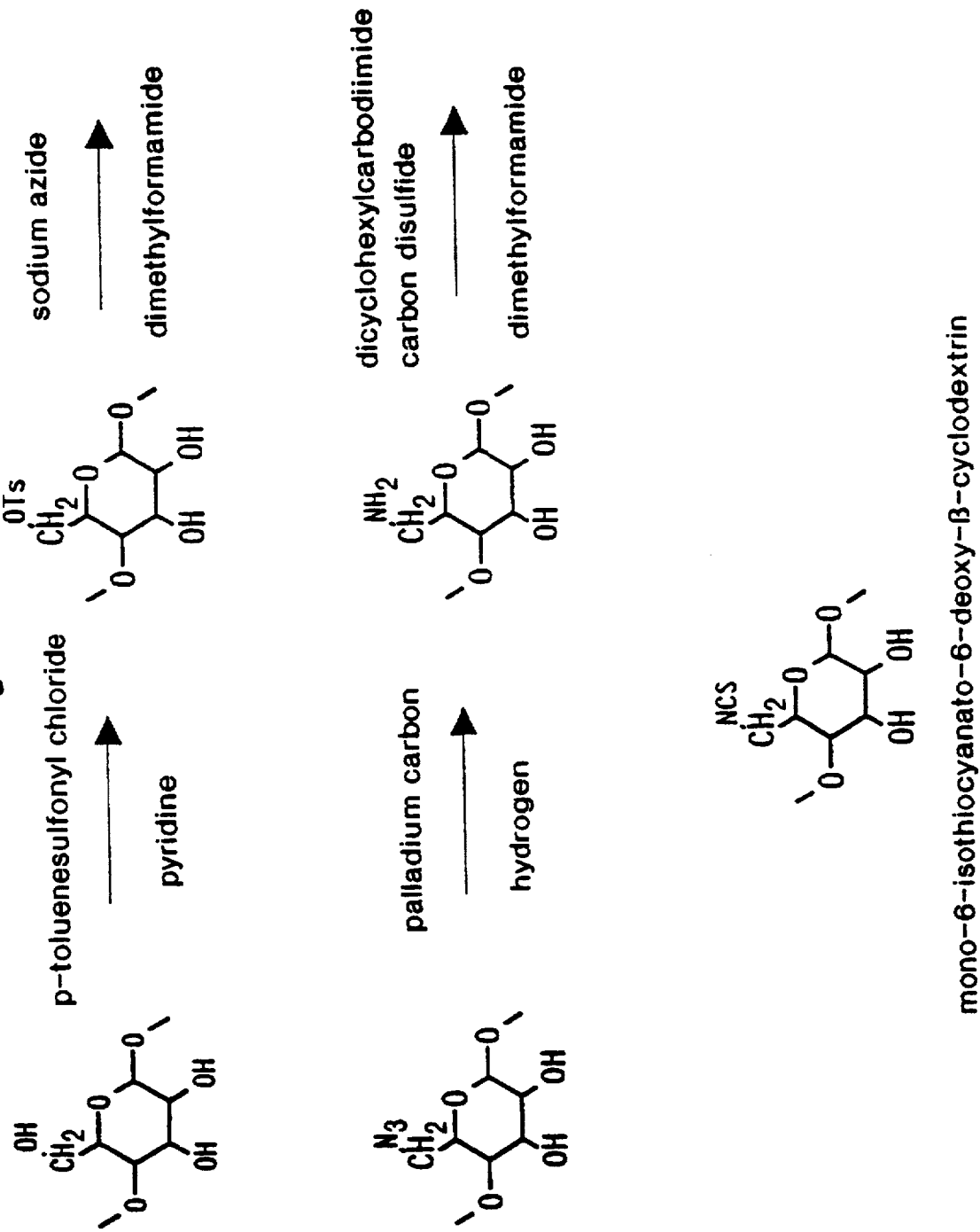

ISOTHIOCYANATED CYCLODEXTRIN DERIVATIVE

BACKGROUND OF THE INVENTION

1. Field of the Invention

The present invention relates to a novel isothiocyanated cyclodextrin derivative which can label various kinds of organic compounds containing an amino group as their functional group (ion-exchanged resins, fibers, food products, medicines, and the like and, in particular, amino groups of biological amines such as amino acids, peptides, proteins, and catecholamines).

2. Related Background Art

It has been known that cyclodextrin (referred to as "CD" hereinafter) has a hydrophobic three-dimensional bucket-shape (or doughnut shape) configuration formed by walls of glucose with a cavity within which a variety of guest molecules can be included. By means of its characteristics, CD has been applied to a variety of industrial fields such as medicines, agricultural chemicals, and cosmetics in which such effects as solidification of liquid materials by clathration and alleviation of irritativeness, bitterness, offensive odor, and the like are provided.

Further, the field of utilization of CD has been expanded, whereby CD derivatives having specific configurations have been synthesized from fundamental α, β, and γ-CDs (designating cyclohexamylose, cycloheptamylose, and cyclooctamylose made of 6, 7, and 8 segments of amylose, respectively) in order to achieve specific uses. Some of them have been commercially available. Among them, CD derivatives in which some sugar chains (maltose and glucose) are bonded to a cyclic cyclodextrin skeleton so as to form further branches (Methods Carbohydr. Chem., 10, 277 (1994)), alkylated CDs (J. Pharm. Pharmacol., 46 (9), 714 (1994)), and the like have been known as derivatives having further improved water-solubility.

SUMMARY OF THE INVENTION

In various kinds of organic compounds containing amino groups, on the other hand, there has been a strong demand for developing the characteristic explained above, namely, a method for labeling them with a CD derivative which can include a variety of guest molecules with an appropriate size within its cavity. Nevertheless, no CD derivative has been known which can efficiently react and combine with various kinds of compounds containing an amino group. If such a method is developed, a labeling reagent by which fundamental functions (e.g., solubility, association, and optical characteristics) of guest molecules are improved on the basis of the above-mentioned clathration can be constructed.

As a result of diligent studies for developing a CD derivative which satisfies the above-mentioned demand, the inventors have succeeded in synthesizing a cyclodextrin derivative in which at least one of primary hydroxyl groups (—CH$_2$OH, hydroxymethyl group) of various CD derivatives has been substituted by an isothiocyanato group (—CH$_2$NCS, isothiocyanatomethyl group), thereby accomplishing the present invention.

Namely, in the present invention, various kinds of cyclodextrin derivatives are used as starting materials, at least one of their primary hydroxyl groups (—CH$_2$OH, hydroxymethyl group) is converted into an amino group (—CH$_2$NH$_2$, aminomethyl group), and then thus formed amino group is converted into isothiocyanato group (—CH$_2$NCS, isothiocyanatomethyl group) by an appropriate dehydrating reaction, whereby a method of synthesizing the aimed cyclodextrin derivative having an isothiocyanato group is established.

More specifically, the present invention relates to a novel cyclodextrin derivative which is synthesized according to the general synthesizing method mentioned above and in which at least one primary hydroxyl group of a cyclodextrin derivative is substituted by an isothiocyanato group.

Namely, the present invention provides a cyclodextrin derivative in which at least one primary hydroxyl group is substituted by an isothiocyanato group.

Also, the present invention provides a compound expressed by general formula (I):

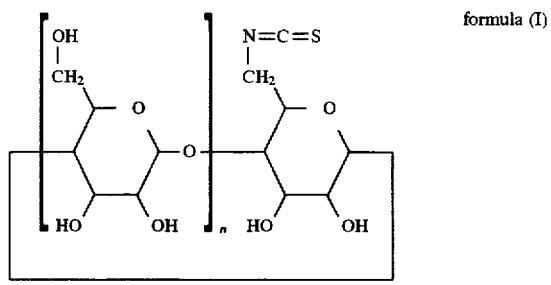

formula (I)

wherein n is an integer from 5 to 7.

Further, the present invention provides a compound expressed by general formula (II):

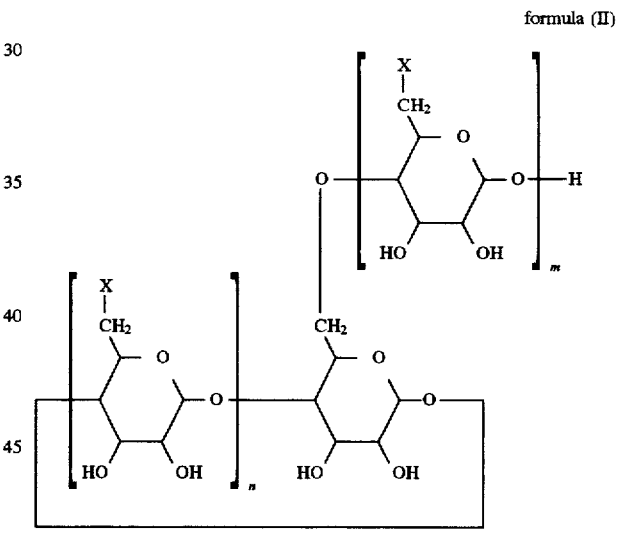

formula (II)

wherein n is an integer from 5 to 7, m is 1 or 2, and X is OH, NCS, OSO$_2$C$_6$H$_4$CH$_3$, N$_3$ or NH$_2$ while at least one X is NCS, OSO$_2$C$_6$H$_4$CH$_3$, N$_3$ NH$_2$.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 25 shows a synthesis path for the compounds of the present invention.

DETAILED DESCRIPTION OF THE PREFERRED EMBODIMENTS

Figure 1:
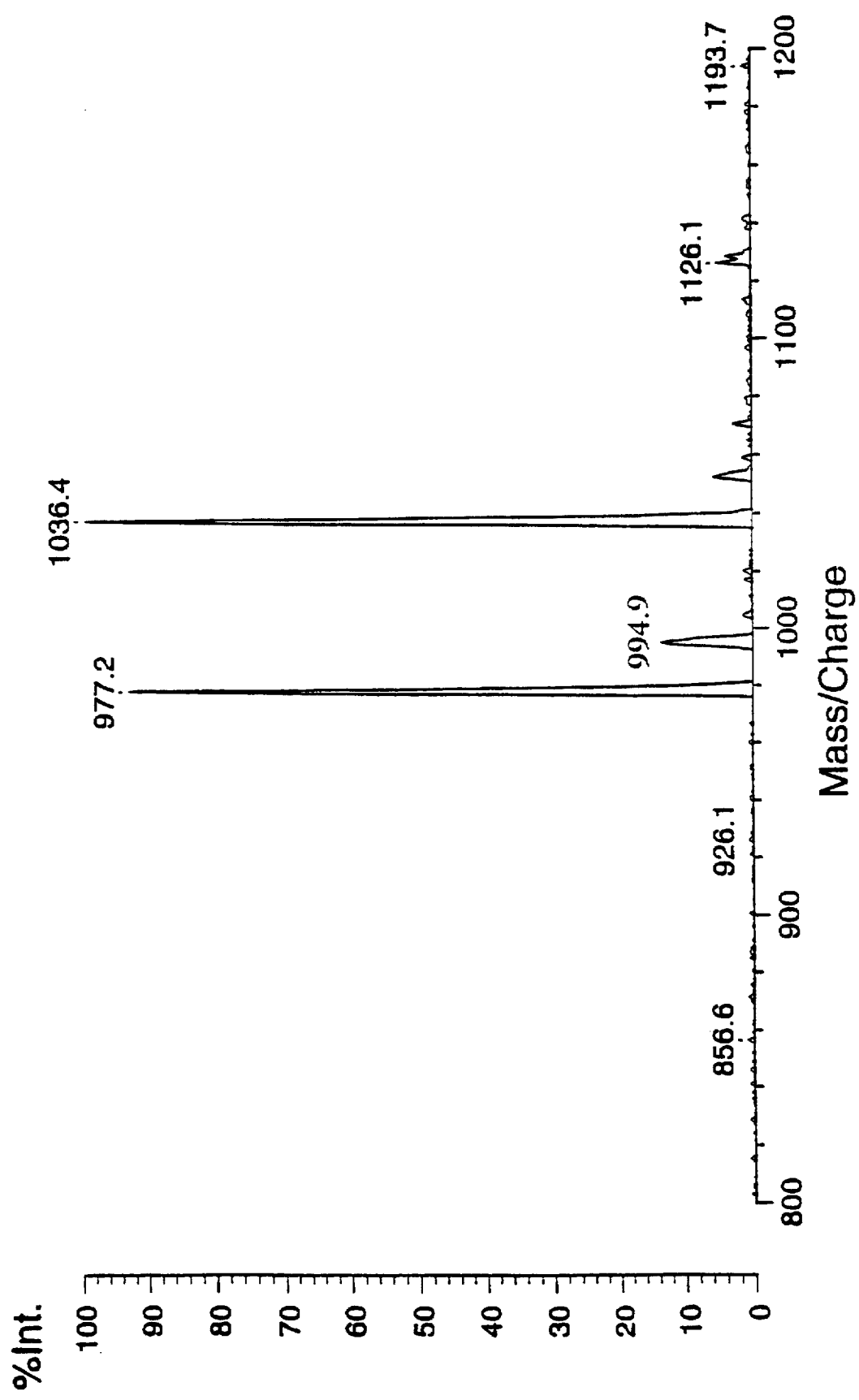
FIG. 1 shows a TOFMS chart of mono-6-isothiocyanato-6-deoxy-α-cyclodextrin(NCS-α-CD).

In the present invention, in order to obtain a CD derivative having a group which can react with an amino group, an isothiocyanato group which is a reactive group with respect to amino groups is introduced into a CD derivative. The CD derivative, which is a starting material, and a method of introducing the isothiocyanato group thereinto will be explained in detail in the following.

Starting Material

From the viewpoint of usability of raw materials, a variety of cyclodextrins are commercially available and, usable. For example, depending on the number of glucose units therein, α-cyclodextrin, β-cyclodextrin, or γ-cyclodextrin is available with a high purity. Accordingly, these cyclodextrins or cyclodextrin derivatives having configurations similar thereto can be preferably used as a starting material for the present invention. Examples of starting materials which can be preferably used include α-cyclodextrin; β-cyclodextrin; γ-cyclodextrin; those with a branched configuration such as glucosyl-α-cyclodextrin, glucosyl-β-cyclodextrin, glucosyl-γ-cyclodextrin, maltosyl-α-cyclodextrin, maltosyl-β-cyclodextrin, and maltosyl-γ-cyclodextrin; alkylated cyclodextrin derivatives such as 6-O-methyl-α-cyclodextrin, 6-O-methyl-β-cyclodextrin, 6-O-methyl-γ-cyclodextrin, 2,6-di-O-methyl-α-cyclodextrin, 2,6-di-O-methyl-β-cyclodextrin, 2,6-di-O-methyl-γ-cyclodextrin, 2,3,6-tri-O-methyl-α-cyclodextrin, 2,6-di-O-ethyl-α-cyclodextrin, 2,3,6-tri-O-ethyl-α-cyclodextrin, and their β-cyclodextrin and γ-cyclodextrin equivalents; hydoxyalkylated cyclodextrins such as 2-hydroxyethyl-α-cyclodextrin, 2-hydroxypropyl-α-cyclodextrin, 3-hydroxypropyl-α-cyclodextrin, 2,3-dihydroxypropyl-α-cyclodextrin, 2,3,6-tri-O-acyl($C_2$ to $C_{18}$)-α-cyclodextrin, O-carboxylmethyl-O-ethyl-α-cyclodextrin, α-cyclodextrin sulfate, α-cyclodextrin phosphate, and their β-cyclodextrin and γ-cyclodextrin equivalents (Kaneto Uegama, Summary of Lectures for the Twelfth Cyclodextrin Symposium, 1 (1993)). Namely, any cyclodextrin can be used as long as it contains at least one hydroxyl group or, preferably, primary hydroxyl group.

Actually, in the method of introducing an isothiocyanato group explained in the following, all the above-mentioned cyclodextrins proceed by substantially the same reaction.

Method of Introducing Isothiocyanato Group

In the present invention, while an isothiocyanato group, which has a high reactivity with respect to amino groups, is introduced into a CD derivative in order to obtain a CD derivative having a group which can react with an amino group; there is no particular restriction with respect to the bonding position to which the isothiocyanato group is introduced nor its bonding method.

In terms of the introducing position of an isothiocyanato group, it is preferable that a hydroxyl group of the CD derivative be substituted by the isothiocyanato group. The CD derivative may have both primary hydroxyl group (—$CH_2OH$) and secondary hydroxyl group (—CH(OH)), and any of them may be substituted by an isothiocyanato group so as to form —$CH_2NCS$ and —CH(NCS), respectively. Further, the number of isothiocyanato groups to be introduced is not restricted in particular, whereby a plurality of isothiocyanato groups may be introduced according to the purposes of the invention.

While the method of introducing the isothiocyanato group by converting a hydroxyl group of the CD derivative thereinto is not restricted in particular, a method based on the synthesis path shown in the drawings (see FIG. 25) is preferable. Namely, a hydroxyl group of a starting CD derivative is sulfonated, turned into an azide, converted into an amino group, and then converted into an isothiocyanato group. In the following description these steps will be explained.

The first step: Though the method of activating the above-mentioned hydroxyl group with respect to a replacement reaction for quantitatively replacing the hydroxyl group with the azido group is not restricted in particular, the activating method by esterification with an aromatic sulfonate is one preferable method. In particular, p-toluenesulfonylation with a p-toluenesulfonyl halide is one of the preferable methods.

Reaction solvents, reaction catalysts, reaction temperature, and the like may be selected in order to perform control such that the above-mentioned activation can be quantitatively effected. In the present invention, typical conditions for aromatic sulfonylation are also usable (see Org. Syn. 20, 50 (1940) and J. Org. Chem., 37, 1259 (1972)). For example, a reaction condition at 0° C. in which pyridine is used as a solvent can be preferably used. For isolating and purifying the reaction product, normal methods of separation, purification, and the like can be used. For example, a separating means based on column chromatography using silica gel or the like and recrystallization from an appropriate solvent or the like can be used. The purity necessary for the present invention is at least 80% and, more preferably, at least 90%. The product can be confirmed by normal structure-determining methods. For example, conversion from a hydroxyl group to a sulfonate group may be confirmed by an infrared absorption spectrum (IR) method, nuclear magnetic resonance absorption spectrum (NMR) method, mass spectrometry (MS) method, elemental analysis, melting point analysis, and the like. The purity of the product can be assumed not only by the foregoing spectra but also by thin layer chromatography (TLC), high-performance liquid chromatography (HPLC), and the like.

The second step: The conversion into an azido group can be effected according to a normal replacement reaction condition (see Carbohydrate Research, 18, 29 (1971)). In this case, the reaction solvent is preferably a polar solvent. For example, it is dimethylformamide (DMF). In order to introduce an azido group, various azide salts (e.g., sodium salts) can be preferably used. The reaction depends on temperature, reaction time, and the like, and its proceeding can be monitored by an appropriate means. TLC, HPLC, and the like can be used as a monitoring method. For isolating and purifying the reaction product, normal methods of separation, purification, and the like can be used. For example, a separating means based on column chromatography using silica gel or the like and recrystallization from an appropriate solvent or the like can be used. The purity necessary for the present invention is at least 80% and, more preferably, at least 90%. The product can be confirmed by normal structure-determining methods. For example, conversion from a hydroxyl group to an azido group may be confirmed by an infrared absorption spectrum (IR) method, nuclear magnetic resonance absorption spectrum (NMR) method, mass spectrometry (MS) method, elemental analysis, melting point analysis, and the like. The purity of the product can be assumed not only by the foregoing spectra but also by thin layer chromatography (TLC), high-performance liquid chromatography (HPLC), and the like.

The third step: The method of converting thus obtained azido group into an amino group is not restricted in particular, and typical hydrogenation reactions and reducing reactions can be used therefor (see Can. J. Chem., 50, 3886 (1972)). In the present invention, normal catalytic hydrogenation reactions can be preferably used. For example, a hydrogenation method with palladium on carbon as a catalyst can be desirably used. The progress of the reaction can be monitored by an appropriate means. TLC, HPLC, and the like can be used as a monitoring method. For isolating and purifying the reaction product, normal methods of separation, purification, and the like can be used. For example, a separating means based on column chromatography using silica gel or the like and recrystallization from an appropriate solvent or the like can be used. The purity necessary for the present invention is at least 80% and, more preferably, at least 90%. The product can be confirmed by normal structure-determining methods. For example, conversion from a hydroxyl group to an amino group may be confirmed by infrared absorption spectrum (IR) method, nuclear magnetic resonance absorption spectrum (NMR) method, mass spectrometry (MS) method, elemental analysis, melting point analysis, and the like. The purity of the product can be assumed not only by the foregoing spectra but also by thin layer chromatography (TLC), high-performance liquid chromatography (HPLC), and the like. Here, there is also preferably used a method in which a sulfonate group is reacted with anhydrous ammonia so as to be directly converted into an amino group (see Aust. J. Chem., 46, 953 (1993)).

The fourth step: In the present invention, a method of dehydrating the thus obtained amino group and converting it into an isothiocyanato group is not restricted in particular, and normal conditions can be preferably used therefor (see J. Am. Chem. Soc., 80, 3332 (1958) and Org. Syn., 21, 81 (1941)). Among various dehydrating reagents, carbodiimides (e.g., dicyclohexylcarbodiimide (DCC)) can be preferably used in particular. In this case, as a reaction solvent, carbon disulfide, DMF, or the like can be preferably used. The proceeding of the reaction can be monitored by an appropriate means. TLC, HPLC, and the like can be used as a monitoring method.

For isolating and purifying an isothiocyanated CD derivative, which is a reaction product, normal methods of separation, purification, and the like can be used. For example, a separating means based on column chromatography using silica gel or the like and recrystallization from an appropriate solvent or the like can be used. The purity necessary for the present invention is at least 80% and, more preferably, at least 90%. When the isothiocyanated CD derivative in accordance with the present invention is used for labeling an amino-containing material, only the isothiocyanato group can be substantially reacted. Namely, in the case where the isothiocyanated CD derivative in accordance with the present invention is used, even when it is in a mixture with other materials or even when it is a mixture of isomers (respectively having different positions to which an isothiocyanato group is bonded or different numbers of isothiocyanato groups), it can be used in a reaction for labeling the aimed desired material without any particular limitation on its purity.

The product can be confirmed by normal structure-determining methods. For example, the position to which an isothiocyanato group is bonded and the number of isothiocyanato groups can be confirmed by measurement of data according to an infrared absorption spectrum (IR) method, nuclear magnetic resonance absorption spectrum (NMR) method, mass spectrometry (MS) method, elemental analysis, melting point analysis, and the like, as well as comparison of thus measured data. The purity of the product can be assumed not only by the foregoing spectra but also by thin layer chromatography (TLC), high-performance liquid chromatography (HPLC), and the like. Also, in a mixture containing the isothiocyanated CD derivative in accordance with the present invention, the presence of the desired derivative and the concentration thereof can be similarly confirmed not only by the foregoing spectra but also by thin layer chromatography (TLC), high-performance liquid chromatography (HPLC), and the like.

Though examples of the present invention are shown in the following, the present invention should not be restricted thereto. While the synthesis path of the isothiocyanated CD derivative in accordance with the present invention has been explained as being divided into four steps for convenience, it should not be restricted thereto. In general, the compound isolated in each reaction step was confirmed under the following HPLC analysis conditions. While the following method was performed on the basis of Melton's method (Carbohydr. Res., 18, 29 (1971)) and Brown's method (Aust. J. Chem., 46, 953 (1993)), the respective conditions for experiments have been subjected to improvement or the like according to necessity.

Column: Kaseisorb LC NH2 SUPER, 4.6I.D. *250 mm (Tokyokasei)

Column temperature: 35° C.

Eluate: 70% acetonitrile, flow rate at 1 ml/min

Detection: 254 nm (UV) absorption or refractive index

EXAMPLE 1

Synthesis of mono-6-O-(2-naphthalenesulfonyl)-6-deoxy-α-cyclodextrin

In an atmosphere of nitrogen, 1.0 g (1.0 mmol) of α-cyclodextrin was added to 70 ml of pyridine and completely dissolved therein. While the thus formed mixture was stirred at room temperature, 0.58 g (2.5 mmol) of naphthalenesulfonyl chloride was added thereto in several portions over about 1 hour. After the addition had been completed, it was confirmed by TLC that the spot ratio between the mononaphthalenesufonyl derivative and the dinaphthalenesulfonyl derivative and the like had become about 1:1, and then 50 ml of water were immediately added to the mixture to stop the reaction. The reaction liquid was concentrated and then fractionated and separated by medium-pressure liquid chromatography. The solvent was removed by evaporation, and the residue was dried under reduced pressure, whereby 0.19 g (yield: 15%) of mono-6-O-(2-naphthalenesulfonyl)-6-deoxy-α-cyclodextrin was obtained as white powder.

TLC analysis:
TLC: Merck, HPTLC-Fertigplatten NH$_2$
Solvent: 60% acetonitrile
Detection: diphenylamine/aniline/phosphoric acid/acetone=2:2:15:100
Rf value: 0.66 (mononaphthalenesulfonyl derivative) 0.83 (dinaphthalenesulfonyl derivative) and 0.35 (α-CD)

Mass spectrometry condition:
Apparatus: Shimadzu Corporation, laser ionization time of flight mass spectrometer (MALDI IV)
Matrix: DHBA (Gentisic acid)
[M+Na]$^+$: 1,187

EXAMPLE 2

Synthesis of mono-6-azido-6-deoxy-α-cyclodextrin

Into 10 ml of water, 0.5 g (0.45 mmol) of the mononaphthalenesulfonyl derivative obtained by Example 1 was dissolved. To this mixture, 0.32 g (4.9 mmol) of sodium azide was added. The resulting mixture was heated to 80° C. and stirred for four hours. Thereafter, it was confirmed by TLC that the derivative spot had disappeared, and then the reaction was terminated. The solvent was removed by evaporation, and the residue was precipitated from acetone, whereby mono-6-azido-6-deoxy-α-cyclodextrin (yield: about 16%) was obtained.

TLC analysis:
TLC: Merck, HPTLC-Fertigplatten NH$_2$
Solvent: 60% acetonitrile
Detection: diphenylamine/aniline/phosphoric acid/acetone=2:2:15:100
Rf value: 0.49 (mono-6-azido-6-deoxy-α-cyclodextrin) and 0.66 (mononaphthalenesulfonyl derivative)

EXAMPLE 3

Synthesis of mono-6-amino-6-deoxy-α-cyclodextrin

Into 20 ml of water, 0.5 g (0.52 mmol) of the monoazide derivative obtained by Example 2 was dissolved. To this mixture, 40 mg of palladium carbon were added and then, for 3 hours, hydrogen gas was supplied at room temperature. The reaction liquid became positive in ninhydrin coloring.

The catalyst was removed by filtration under reduced pressure. The filtrate was concentrated under reduced pressure and then precipitated from acetone, whereby 0.41 g (yield: 81%) of mono-6-amino-6-deoxy-α-cyclodextrin was obtained.

TLC analysis:
TLC: Merck, HPTLC-Fertigplatten NH$_2$
Solvent: 60% acetonitrile
Detection: diphenylamine/aniline/phosphoric acid/acetone=2:2:15:100
Rf value: 0.43 (mono-6-amino-6-deoxy-α-cyclodextrin) and 0.49 (mono azido derivative)
TLC: Merck, Kieselgel 60F 254

Mass spectrometry condition:
Apparatus: Shimadzu Corporation, laser ionization time of flight mass spectrometer (MALDI IV)
Matrix: DHBA (Gentisic acid)
[(M−1)+Na]$^+$: 994

EXAMPLE 4

Synthesis of mono-6-isothiocyanato-6-deoxy-α-cyclodextrin(NCS-α-CD)

Into 25 ml of DMF, 0.4 g (0.42 mmol) of the monoamino derivative obtained by the reaction according to Example 3 was dissolved, and 0.5 ml of carbon disulfide was added thereto. The resulting solution was cooled to 3° C. under a nitrogen flow, and, while the solution was stirred, 90 mg (0.44 mmol) of dicyclohexylcarbodiimide in DMF solution were added dropwise thereto. After the addition had been completed, the reaction temperature was returned to room temperature, and then the mixture was stirred for about 4 hours. When it was confirmed that the ninhydrin coloring had become negative, the reaction was terminated. It was confirmed that the ninhydrin coloring had become negative, the spot of the amino derivative had disappeared on the TLC, and a new spot had appeared due to the product.

DMF was removed by evaporation, and acetone was added to the residue so as to form a precipitate. This procedure was repeated once again, and then the precipitate collected was dissolved in water and then precipitated from acetone. Thus obtained precipitate was dried under reduced pressure, whereby 0.27 g (yield: 65%, purity not lower than about 80% (according to TLC)) of mono-6-isothiocyanato-6-deoxy-α-cyclodextrin was obtained as pale yellow powder.

TLC analysis:
   TLC: Merck, HPTLC-Fertigplatten $NH_2$
   Solvent: 60% acetonitrile
   Detection: diphenylamine/aniline/phosphoric acid/acetone=2:2:15:100
   Rf value: 0.47 (mono isothiocyanato derivative) and 0.43 (monoamino derivative)

Mass spectrometry condition:
   Apparatus: Shimadzu Corporation, laser ionization time of flight mass spectrometer (MALDI IV)
   $|M+Na|^+$: 1,036, $|(M-HNCS)+Na|^+$: 977, $|NH2-\alpha-CD+Na|^+$: 995 (See FIG. 1)

Figure 2:
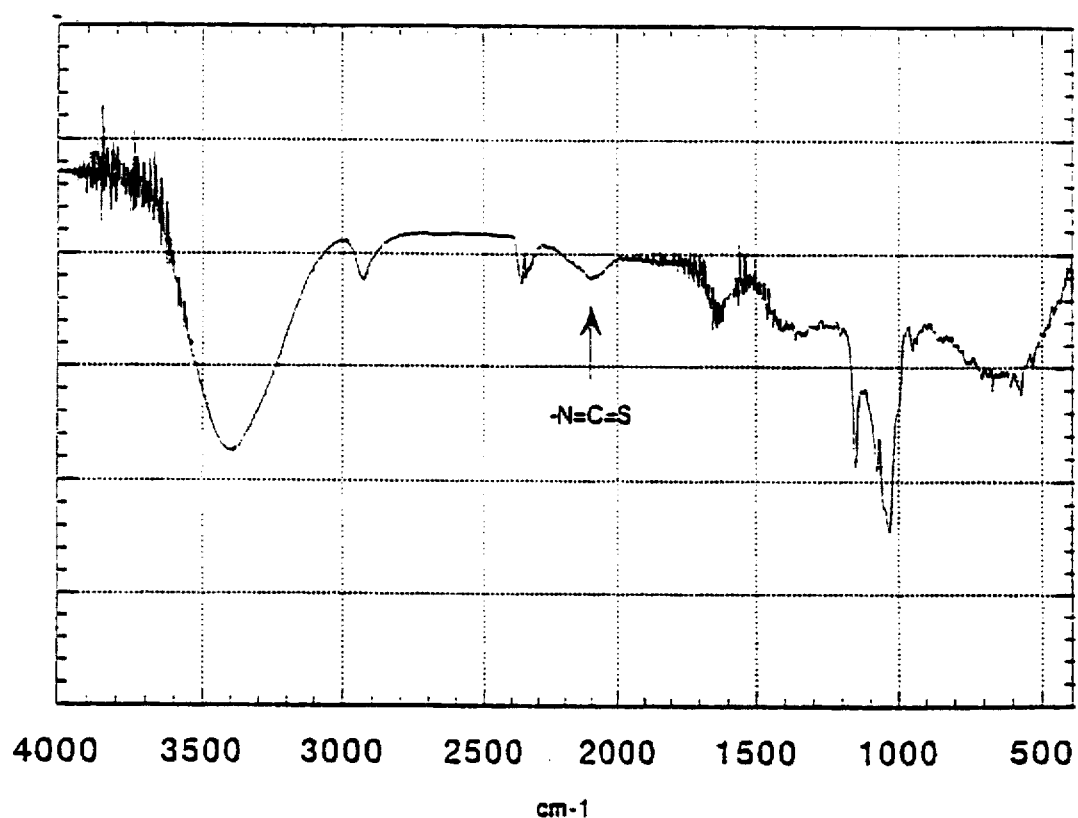
FIG. 2 shows a IR chart of mono-6-isothiocyanato-6-deoxy-α-cyclodextrin(NCS-α-CD).

IR analysis condition:
   Apparatus: JIR-WINSPEC Fourier-transform infrared absorption spectrophotometer manufactured by JEOL Co., Ltd.
   2,100 $cm^{-1}$ (KBr, isothiocyanato group, See FIG. 2)

Figure 3A:
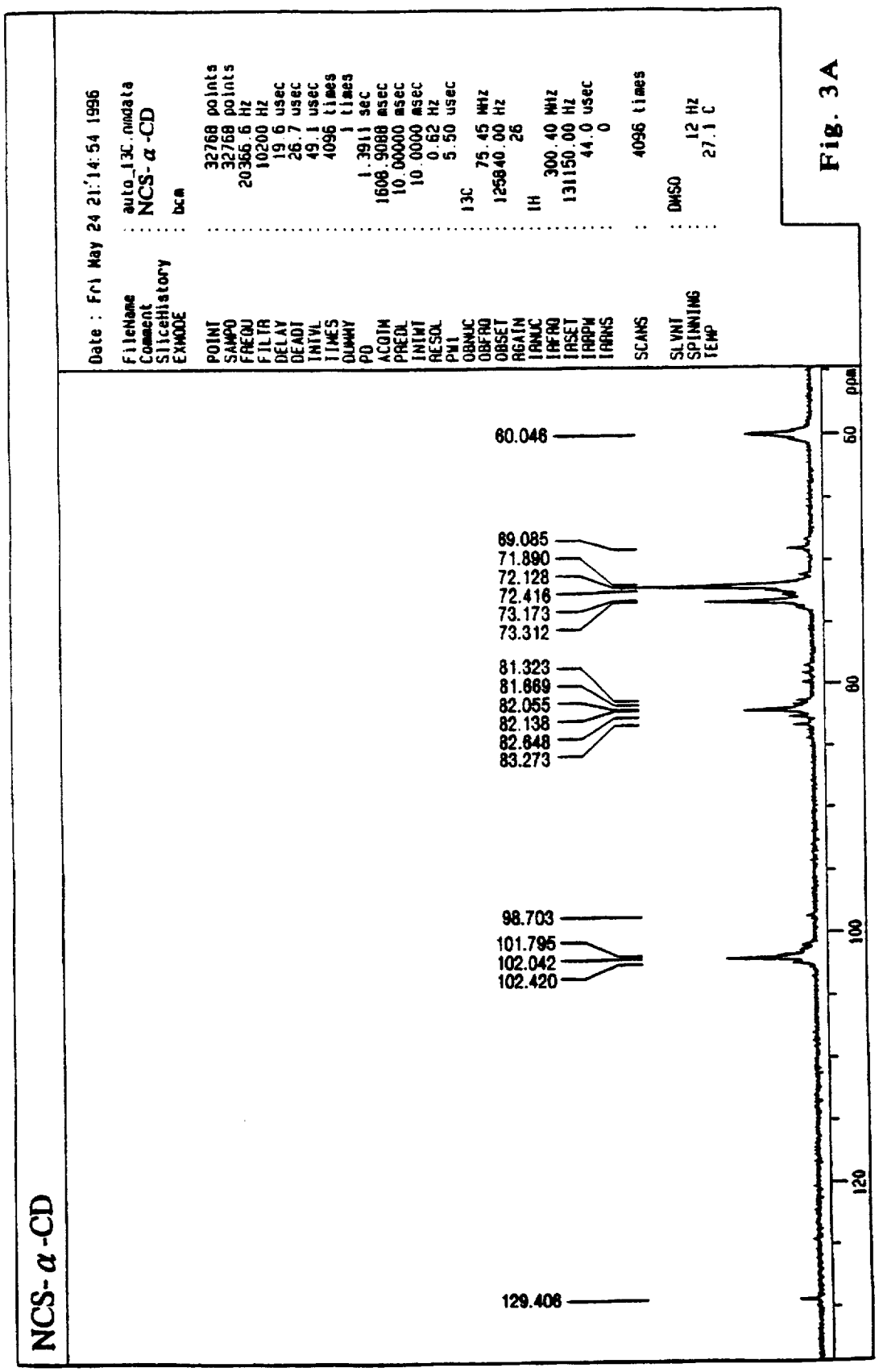
FIG. 3 shows a $^{13}$C-NMR chart of mono-6-isothiocyanato-6-deoxy-α-cyclodextrin(NCS-α-CD).
Figure 3B:
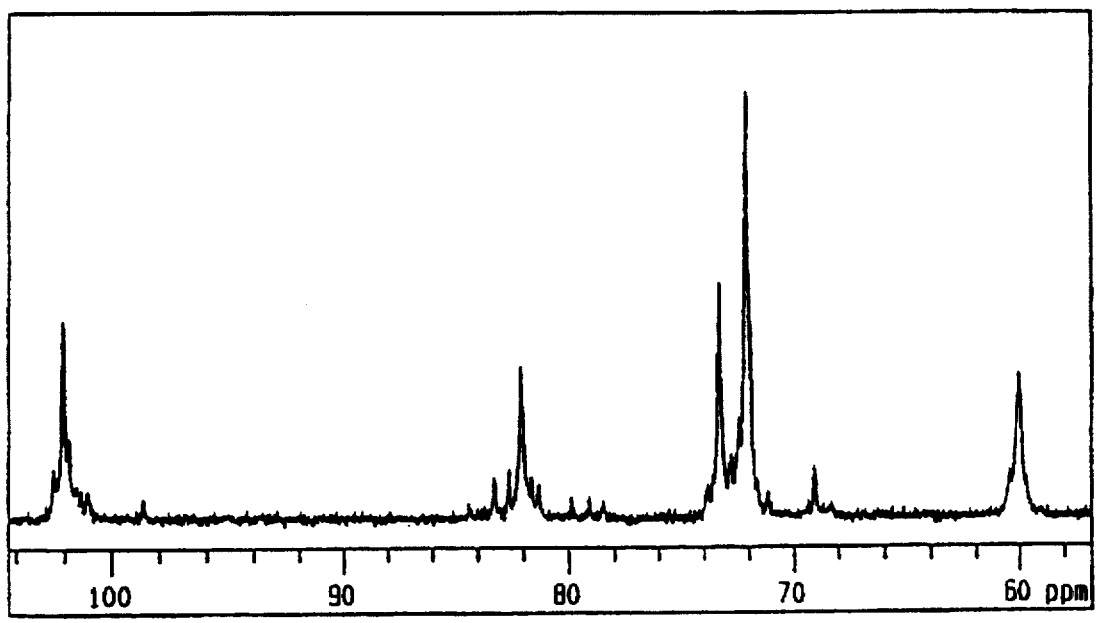

NMR analysis condition:
   Apparatus: LA300 nuclear magnetic resonance apparatus manufactured by JEOL Co., Ltd. Same analytical system was used in experiments described below.
   $^{13}C$ (DMSO-$d_6$, TMS, δ ppm): 129.4 (NCS group, See FIG. 3)

EXAMPLE 5

Synthesis of mono-6-O-(4-tolylsulfonyl)-6-deoxy-β-cyclodextrin

In an atmosphere of nitrogen, 200 ml of pyridine and 20 g (17.6 mmol) of β-cyclodextrin were heated to about 30° C. and completely dissolved. After they had been dissolved, the mixture was cooled to about 0° C. with an ice bath. Then, while the mixture was sufficiently stirred, 6.7 g (35 mmol) of p-toluenesulfonyl chloride were added thereto at once. After the mixture had been stirred for 2 hours, the end of the reaction was confirmed by TLC, and then 5 ml of water were added to the mixture to stop the reaction. The solvent was removed by evaporation under reduced pressure, whereby 42 g of a transparent and colorless syrup-like material containing a large amount of the solvent were obtained. Of this syrup-like material, 3 g were subjected to separation and purification by column chromatography and then freeze-dried, whereby 640 mg of mono-6-O-(4-tolylsulfonyl)-6-deoxy-β-cyclodextrin (monotosyl derivative) were obtained as white powder.

TLC analysis:
   Plate: Fuji Silysia Chem. Co., silikagel NH2 TLC plate
   Solvent: 60% acetonitrile
   Detection: diphenylamine/aniline/phosphoric acid/acetone (2:2:15:100)
   monotosyl derivative: Rf=0.45
   ditosyl derivative: Rf=0.70
   β-cyclodextrin: Rf=0.35

Column chromatography analysis condition:
   Column: Fuji Silysia Chem. Co., silikagel Chromatorex NH-DM1020
   Aminopropyl silanated type, 100 to 200 mesh, pore size 100A 50ID*400 mm
   Eluate: 60% acetonitrile, flow rate at 20 ml/min
   Detection: according to the above-mentioned TLC analysis IR analysis (FT/IR-200 manufactured by JASCO Corporation Co., Ltd., KBr): 1,340 $cm^{-1}$ ($v_{as}SO_2$ of sulfonate group)

EXAMPLE 6

Synthesis of mono-6-azido-6-deoxy-β-cyclodextrin

In a mixture of 50 ml of dimethylformamide and 2 ml of water, 1.0 g (0.78 mmol) of the monotosyl derivative obtained by Example 5 and 900 mg (13.8 mmol) of sodium azide were stirred for about 3 hours at 90° to 100° C. Then, the end of the reaction was confirmed by TLC. After the solvent was removed by evaporation under reduced pressure, the residue was subjected to separation and purification by column chromatography. The separated fraction thus obtained was freeze-dried, whereby 860 mg (yield: 96%) of an azide derivative was obtained as white powder.

TLC analysis:
   Plate: Fuji Silysia Chem. Co., silikagel NH2 TLC plate
   Solvent: 60% acetonitrile
   Detection: diphenylamine/aniline/phosphoric acid/acetone (2:2:15:100)
   monotosyl derivative: Rf=0.45
   azide derivative: Rf=0.40

Column chromatography analysis condition:
   Column: Fuji Silysia Chem. Co., silikagel Chromatorex NH-DM1020
   Aminopropyl silanated type, 100 to 200 mesh, pore size 100A 50ID*400 mm
   Eluate: 60% acetonitrile, flow rate at 20 ml/min
   Detection: according to the above-mentioned TLC analysis IR analysis( Nippon Bunko Kogyo, FT/IR-200 ,KBr (Same analytical system was used described below): 2,120 $cm^{-1}$ (azido group)

EXAMPLE 7

Synthesis of mono-6-amino-6-deoxy-β-cyclodextrin

In an atmosphere of nitrogen, while 860 mg (0.74 mmol) of the monoazide derivative (6-azido-6-deoxycyclohexamylose) obtained by Example 6 and 200 mg of 10% palladium carbon (containing 50% of water, manufactured by Wako Pure Chemical Corporation) were stirred in a mixture of 50 ml of water and 50 ml of ethanol at room temperature, hydrogen gas was introduced thereinto, allowing them to react for about 4 hours. The end of the reaction was confirmed by TLC. The catalyst was filtered out, and the solvent in the filtrate was removed by evaporation under reduced pressure. The resulting residue was freeze-dried, whereby 750 mg (yield: 89%) of a monoamine derivative were obtained as a white solid.

TLC analysis condition:
   Plate: Fuji Silysia Chem. Co., silikagel NH2 TLC plate
   Solvent: 60% acetonitrile
   Detection: diphenylamine/aniline/phosphoric acid/acetone (2:2:15:100)
   monoamine derivative: Rf=0.35
   azide derivative: Rf=0.40

MS analysis (JEOL JMS/AX-505 manufactured by JEOL Co., Ltd.) : 1134 ($M^+$)

EXAMPLE 8

Synthesis of mono-6-isothiocyanato-6-deoxy-β-cyclodextrin(NCS-β-CD)

In an atmosphere of nitrogen, 300 mg (0.265 mmol) of the monoamine derivative obtained by Example 7 were dissolved in 15 ml of DMF. Then, while the mixture was cooled with ice, 23 mg (0.3 mmol) of carbon disulfide and 62 mg (0.3 mmol) of dicyclohexylcarbodiimide were added thereto. After the resulting mixture had been stirred for about 6 hours, it was confirmed by TLC that the monoamine derivative had disappeared. After 1 ml of water was added to the reaction system, the mixture was left overnight in a refrigerator. Dicyclohexylurea precipitated thereby was filtered out. Then, the filtrate was added to 50 ml of water while being stirred, and the mixture was freeze-dried, whereby 215 mg (with a purity of not lower than 80% according to TLC analysis) of mono-6-isothiocyanato-6-deoxy-β-cyclodextrin were obtained.

TLC analysis:
Plate: Fuji Silysia Chem. Co., silikagel NH2 TLC plate
Solvent: 60% acetonitrile
Detection: diphenylamine/aniline/phosphoric acid/acetone (2:2:15:100)
monoamine derivative: Rf=0.35
isothiocyanato derivative: reacted on TLC plate, and remained on the original position.

Figure 4:
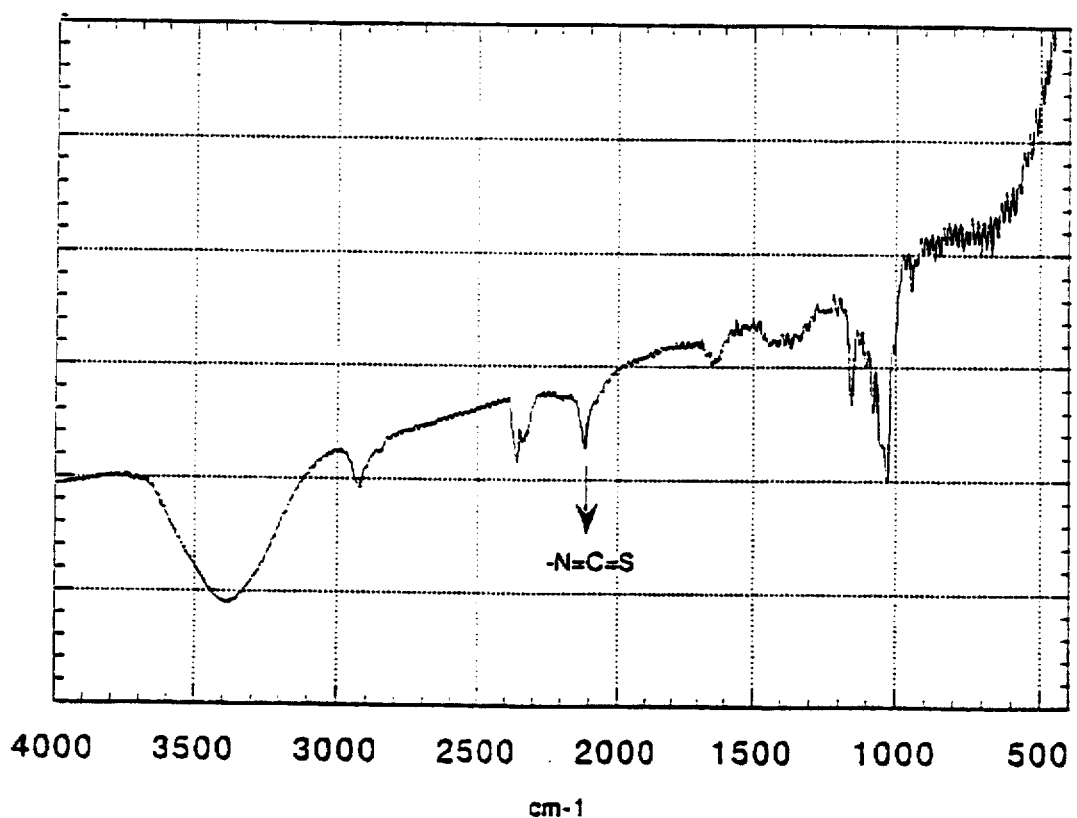
FIG. 4 shows a IR chart of mono-6-isothiocyanato-6-deoxy-β-cyclodextrin(NCS-β-CD).

IR analysis:
2,120 $cm^{-1}$ (isothiocyanato group, see FIG. 4).

Figure 5A:
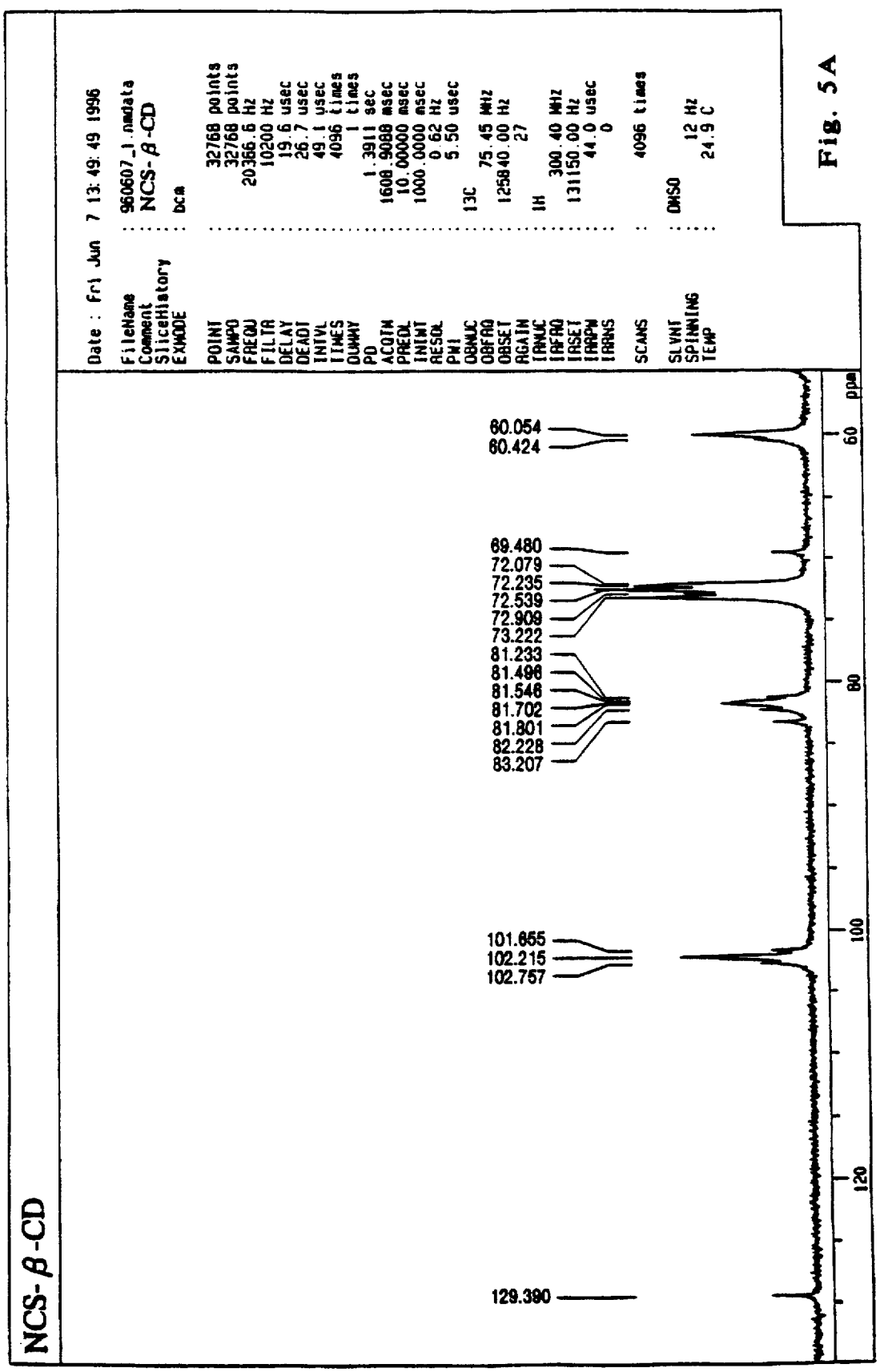
FIG. 5 shows a $^{13}$C-NMR chart of mono-6-isothiocyanato-6-deoxy-β-cyclodextrin(NCS-β-CD).
Figure 5B:
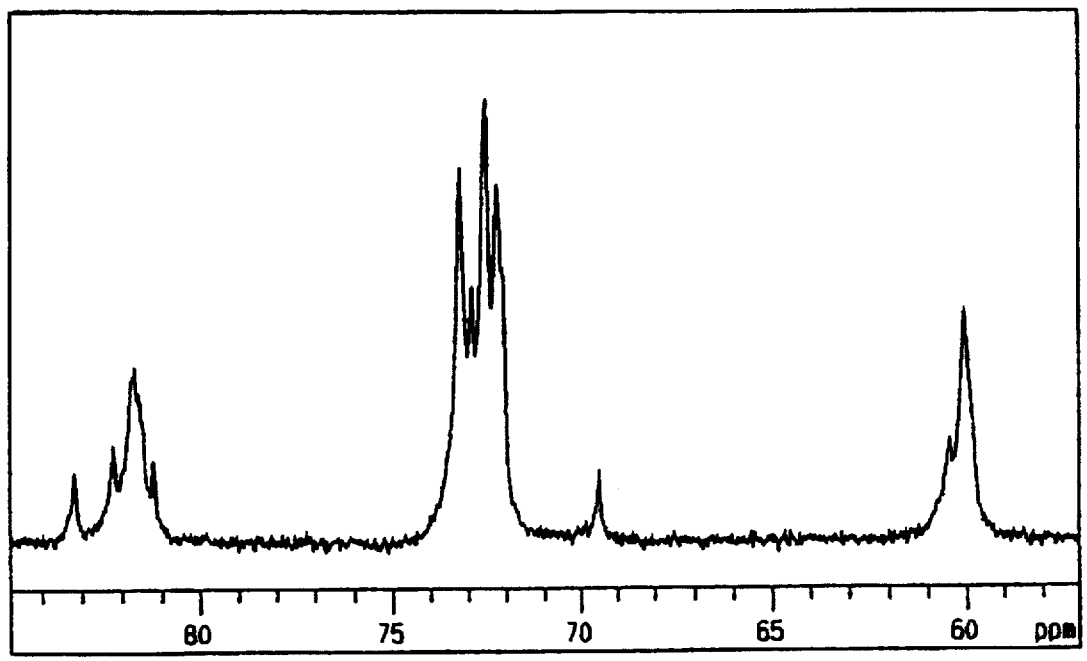

NMR analysis:
$^{13}C$ (DMSO-$d_6$, TMS, δ ppm): 129.4 (NCS group, See FIG. 5)

Figure 6:
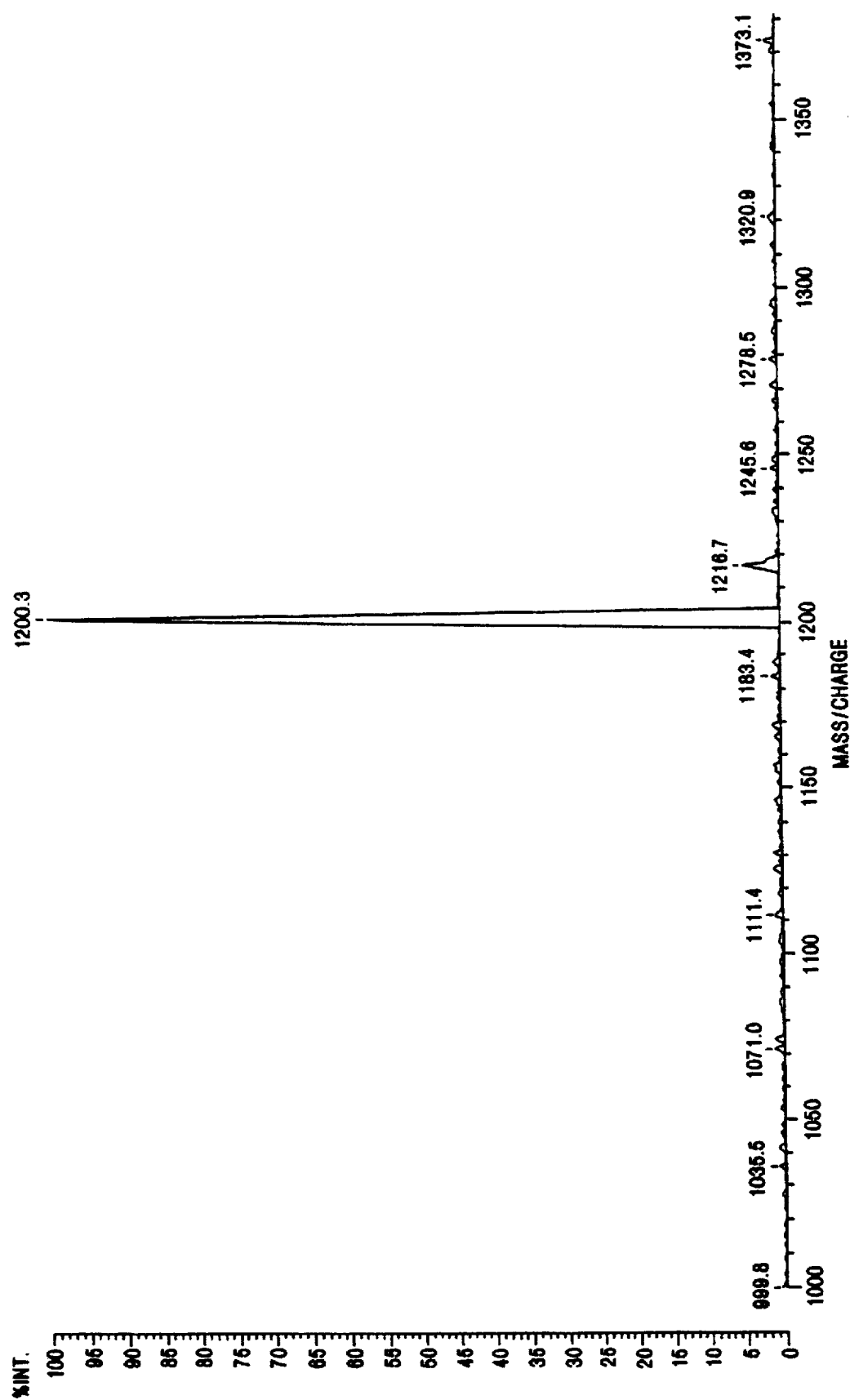
FIG. 6 shows a TOFMS chart of mono-6-isothiocyanato-6-deoxy-β-cyclodextrin(NCS-β-CD).

Mass spectrometry condition:
Apparatus: Shimadzu Corporation, laser ionization time of flight mass spectrometer (MALDI IV) (Same analytical system was used in experiments described below).
Matrix: DHBA (Gentisic acid)
$[M+Na]^+$: 1,200 (See FIG. 6)

EXAMPLE 9

Synthesis of mono-6-O-(2-naphthalenesulfonyl)-6-deoxy-γ-cyclodextrin

In an atmosphere of nitrogen, 50 g (38.6 mmol) of γ-cyclodextrin were added to 300 ml of pyridine, and then the mixture was cooled to 5° C. with an ice bath. The reaction temperature was maintained at 5° to 7° C., and, while the mixture was stirred, 20 g (88.2 mmol) of naphthalenesulfonyl chloride were added thereto in several portions over about 1 hour. Immediately after this addition had been completed, 50 ml of water were added to the mixture to stop the reaction. The reaction solution was concentrated, and then a large excess amount of acetone was added thereto. A white precipitate obtained thereby was filtered out and separated. The resulting powder was dried and then dissolved in 200 ml of DMF. While this mixture was stirred, acetonitrile was added dropwise thereto from a separating funnel. After the precipitate initially deposited.(mainly composed of unreacted γ-cyclodextrin) was filtered out, acetonitrile was further added dropwise to the filtrate, whereby a fraction mainly composed of a mononaphthalenesulfonyl derivative was obtained as white powder.

This powder was suspended in 500 ml of water, and the mixture was stirred overnight at 50° C., whereby the remaining unreacted γ-cyclodextrin was dissolved. The resulting precipitate was filtered out, dried, and then dissolved in DMF. Acetone was added dropwise to this solution, and the precipitate deposited thereby was filtered out and dried, whereby 5.3 g (yield: 9.3%) of substantially pure mono-6-O-(2-naphthalenesulfonyl)-6-deoxy-γ-cyclodextrin were obtained.

Analysis HPLC:
Apparatus: Shimadzu Corporation, LC-64
Detection: Refractive index detector RID-64
Column: Kaseisorb LC-NH2, Super, 6 mm (diameter)× 250 mm
Solvent: 60% acetonitrile
Flow rate: 1.0 ml/min
Retention time of mononaphthalenesulfonyl derivative: 4.8 min

EXAMPLE 10

Synthesis of mono-6-azido-6-deoxy-γ-cyclodextrin

Into a mixture of 100 ml of dimethylformamide and 10 ml of water, 9.1 g (6.1 mmol) of the mononaphthalenesulfonyl derivative obtained by Example 9 and 3.9 g (60 mmol) of sodium azide were dissolved, and the resulting mixture was heated to 95° to 100° C. and stirred for 4 hours. The solvent was removed by evaporation. From thus obtained syrup-like residue, a peak component having a retention time of 4.7 minutes was concentrated by preparative HPLC. The resulting concentration was precipitated from acetone, whereby 1.4 g (yield: 16%) of mono-6-azido-6-deoxy-γ-cyclodextrin were obtained.

Analysis HPLC condition:
Apparatus: Shimadzu Corporation, LC-64
Detection: Refractive index detector RID-64
Column: Kaseisorb LC-NH2, Super, 6 mm (diameter)× 250 mm
Solvent: 60% acetonitrile
Flow rate: 1.0 ml/min
Retention time of N3-γ-CD: 4.7 min Preparative HPLC condition:
Apparatus: Shimadzu Corporation, LC-64
Column: 40 mm (diameter)×1,000 mm
Filler: Fuji Chemical Industry Co., Ltd., NH-DU 3050
Solvent: 60% acetonitrile
Flow rate: 30 ml/min
IR analysis: 2,100 $cm^{-1}$ (azido group)

EXAMPLE 11

Synthesis of mono-6-amino-6-γ-deoxy-cyclodextrin

Into 100 ml of water, 3.2 g (2.4 mmol) of the monoazide derivative obtained by Example 10 were dissolved. To this mixture, 600 mg of palladium carbon were added and, at room temperature, hydrogen gas was supplied for 2 hours. The reaction liquid became positive in ninhydrin coloring.

The catalyst was removed by filtration under reduced pressure. The filtrate was concentrated under reduced pressure and then precipitated from acetone, whereby mono-6-amino-6-deoxy-cyclodextrin was obtained. Thus obtained white precipitate was dried under reduced pressure and then used as it was in the next reaction.

EXAMPLE 12

Synthesis of mono-6-isothiocyanato-6-γ-deoxycyclodextrin(NCS-γ-CD)

Into 100 ml of DMF, the monoamino derivative obtained by the reaction of Example 11 was dissolved, and 10 ml (about 0.16 mol) of carbon disulfide were added thereto. The resulting solution was cooled to 3° C. under a nitrogen flow and, while being stirred, 570 mg (3.00 mmol) of N-ethyl-N'-(N,N-dimethyl-3-aminopropyl)-carbodiimide hydrochloride (manufactured by Osaka Organic Chemical Laboratory) in DMF solution were added dropwise thereto. After this addition had been completed, the reaction temperature was returned to room temperature, and then the mixture was stirred for about 4 hours. After it was confirmed that the ninhydrin coloring had become negative, the reaction was terminated.

DMF was removed by evaporation. The residue was dissolved in a small amount of DMF, and a large excess amount of acetone was added thereto, whereby a precipitate was deposited. After this procedure had been repeated once again, the precipitate collected was dissolved in water and then precipitated from acetone. Thus obtained precipitate was dried under reduced pressure, whereby 2.00 g (yield: 62%) of mono-6-isothiocyanato-6-γ-deoxycyclodextrin were obtained as white powder.

Figure 7:
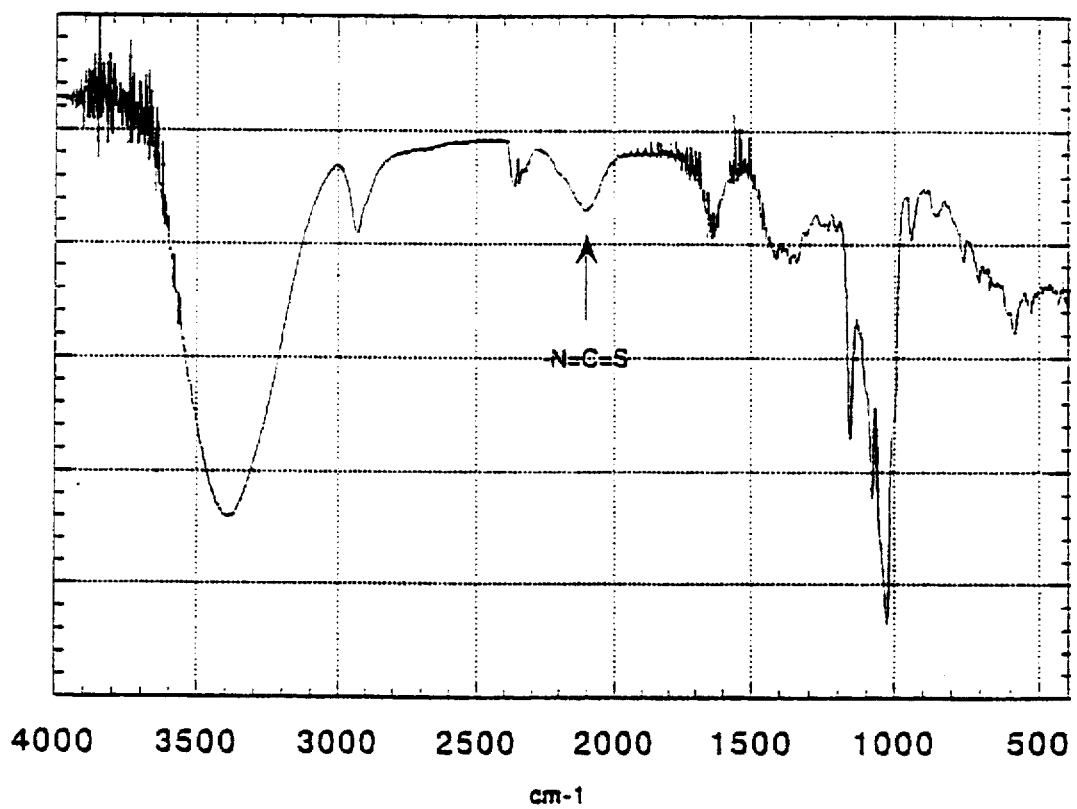
FIG. 7 shows a IR chart of mono-6-isothiocyanato-6-deoxy-γ-cyclodextrin(NCS-γ-CD).

IR analysis:
2,100 cm$^{-1}$ (isothiocyanato (NCS) group, see FIG. 7)

Figure 8A:
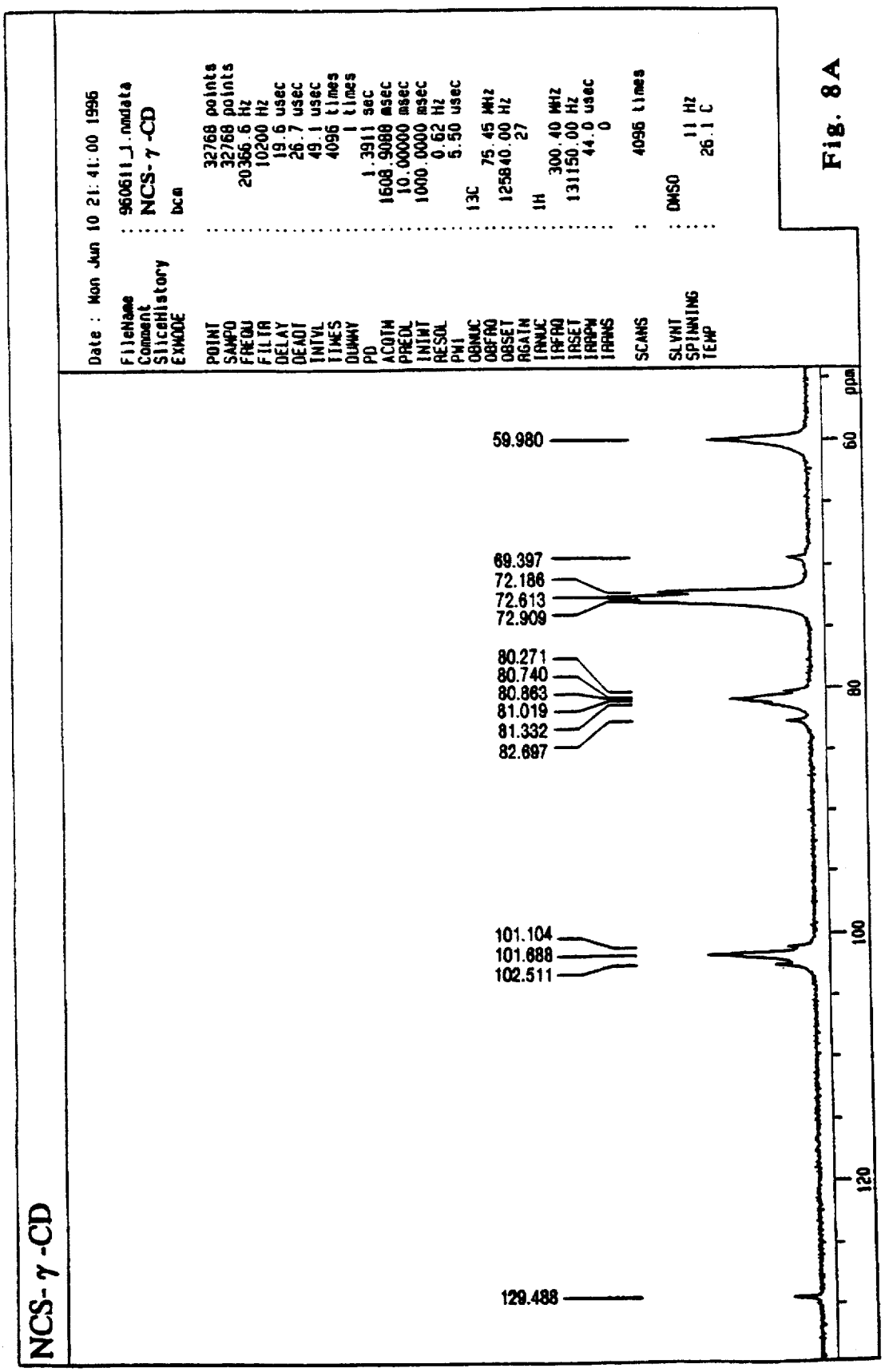
FIG. 8 shows a $^{13}$C-NMR chart of mono-6-isothiocyanato-6-deoxy-γ-cyclodextrin(NCS-γ-CD).
Figure 8B:
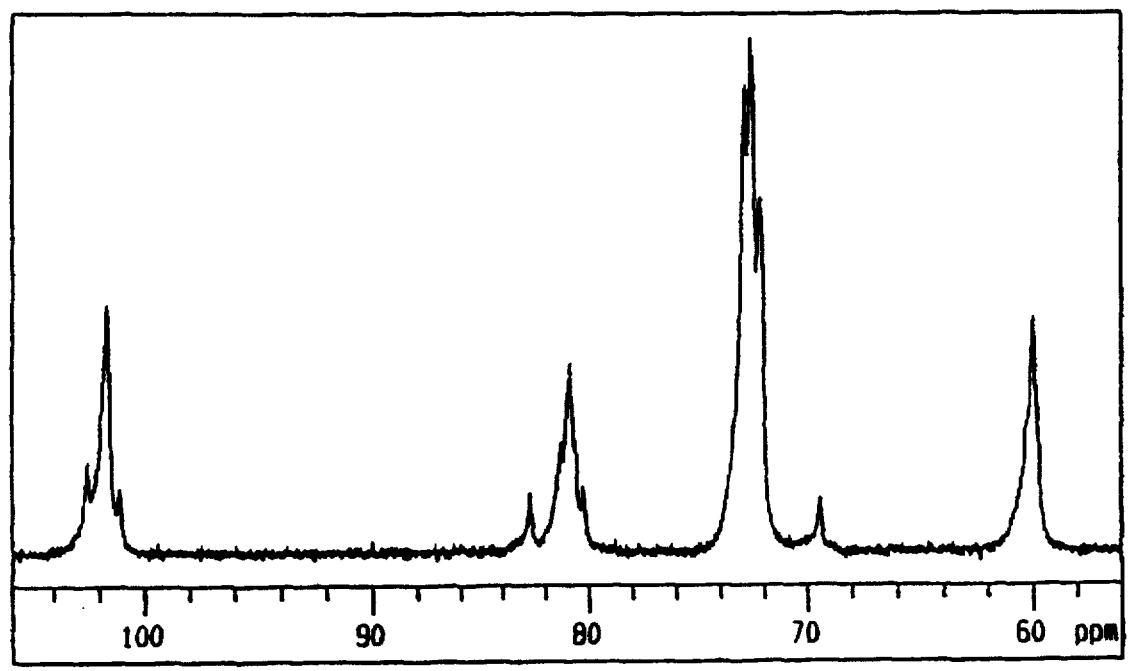

NMR analysis:
$^{13}$C (DMSO-d$_6$, TMS, δ ppm): 129.5 (NCS group, see FIG. 8)

Figure 9:
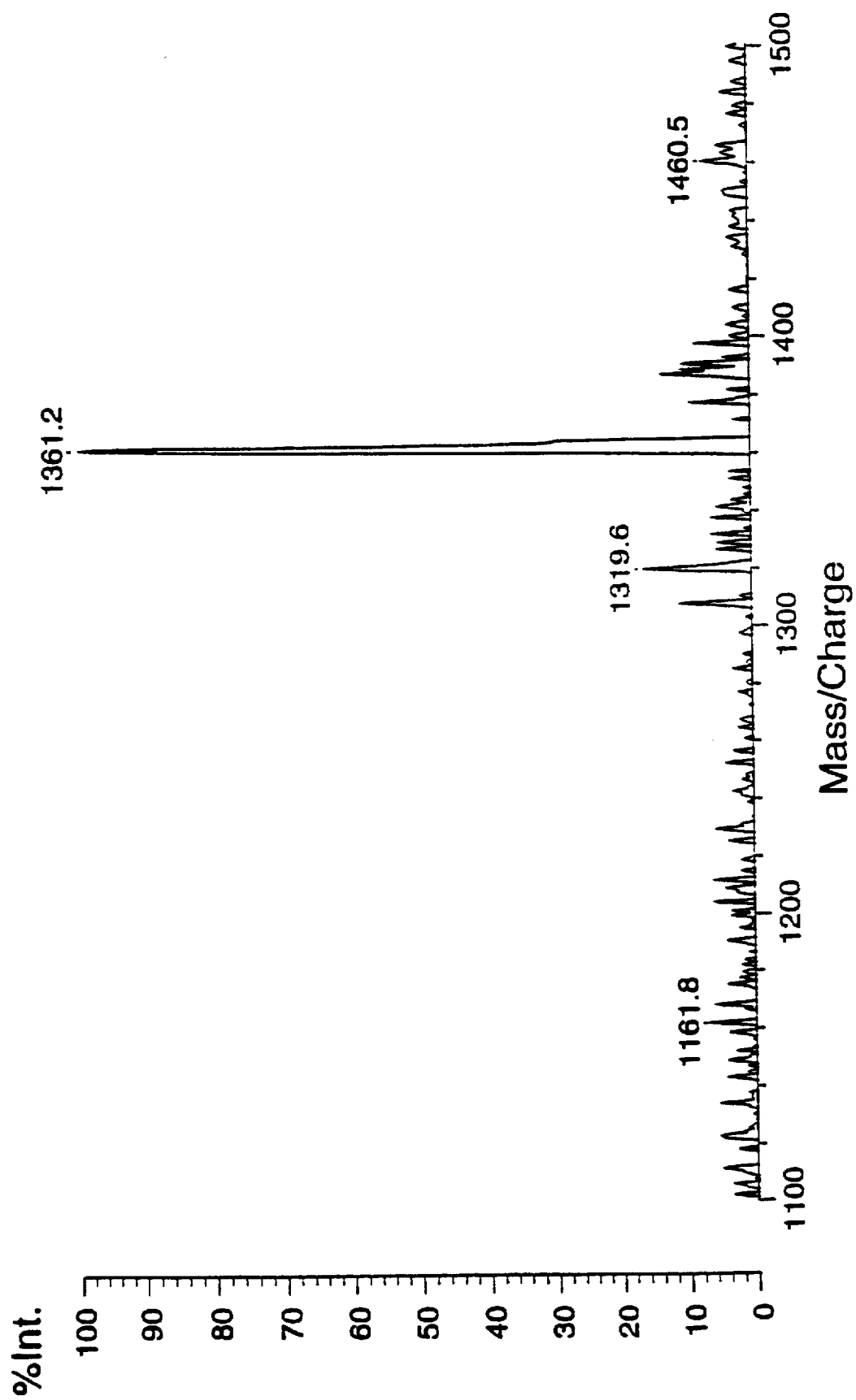
FIG. 9 shows a TOFMS chart of mono-6-isothiocyanato-6-deoxy-γ-cyclodextrin(NCS-γ-CD).

Mass spectrometry:
Matrix: DHBA (Gentisic acid)
[M+Na]$^+$: 1361, [NH2-γ-CD+Na]$^+$: 1320 (see FIG. 9)

EXAMPLE 13

Synthesis of mono-6-O-(4-toluenesulfonyl)-6-deoxy-(maltosyl)-β-cyclodextrin (Ts-G2-β-CD)

In an atmosphere of nitrogen, while 30 g (20.6 mmol) of maltosyl-β-cyclodextrin in 300 ml of pyridine were stirred at room temperature, 6.0 g (31.5 mmol) of p-toluenesulfonyl chloride were added thereto in several portions. The resulting mixture was stirred overnight at room temperature as it was. Thereafter, the solvent was removed under reduced pressure, whereby a syrup-like raw product was obtained. Upon HPLC analysis, 4 peaks were observed in this raw product. The first, last, and third peaks were confirmed to be the excess p-toluenesulfonate, unreacted maltosyl-β-cyclodextrin, and main product, respectively. This main product was dispensed and purified by preparative HPLC. From the fraction eluting the component corresponding to the third peak, i.e., main product or mono-6-O-(4-toluenesulfonyl)-6-deoxy-(maltosyl)-β-cyclodextrin, the solvent was removed under reduced pressure. Then, the remaining aqueous solution was freeze-dried, whereby 8.9 g (yield: 27%) of white powder were obtained.

Figure 10:
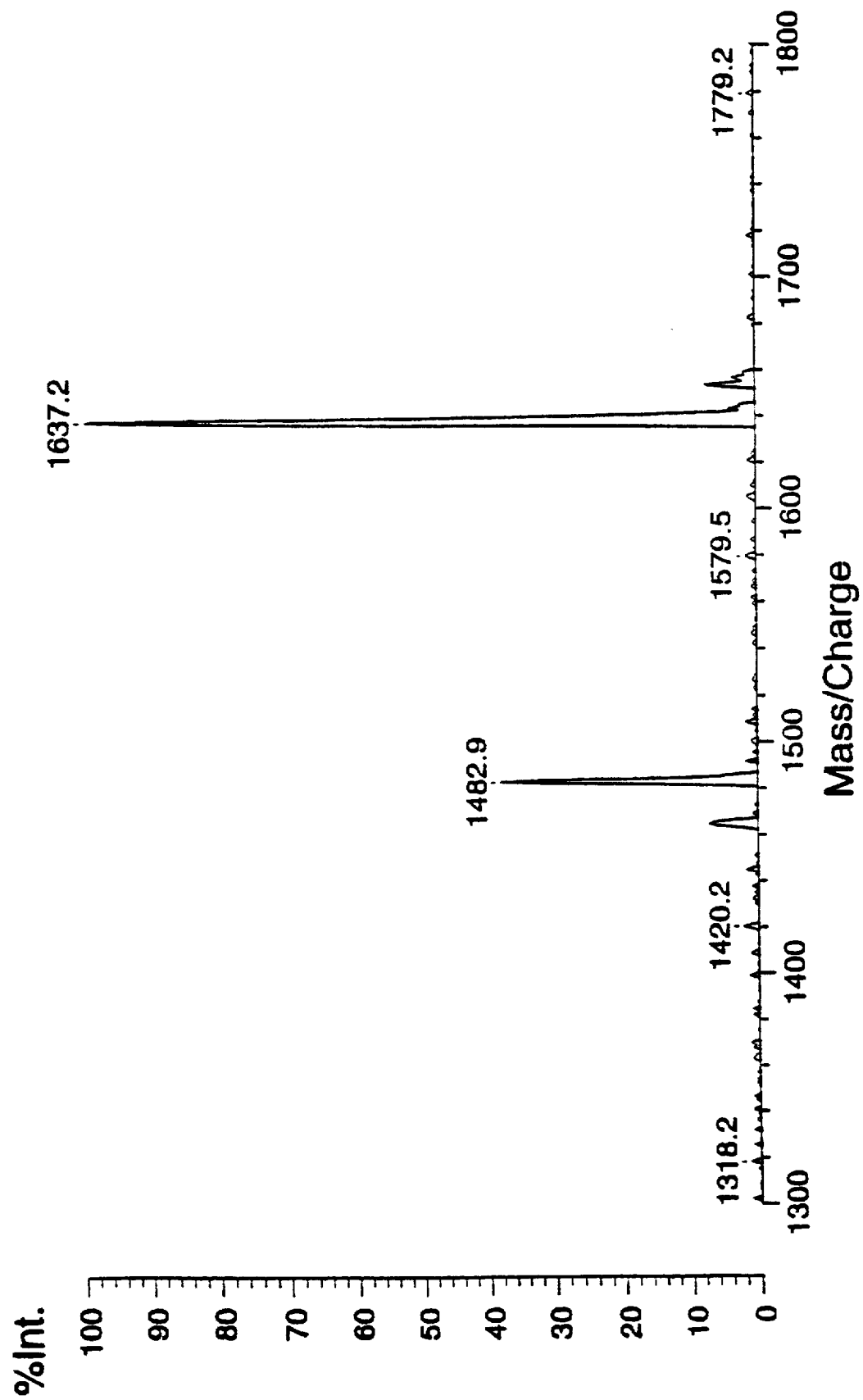
FIG. 10 shows a TOFMS chart of mono-6-O-(4-toluenesulfonyl)-6-deoxy-(maltosyl)-β-cyclodextrin(Ts-G2-β-CD).

Instruments of analysis HPLC and condition in use:
Apparatus: Shimadzu Corporation Co., Ltd., LC-64
Detection: Refractive index detector RID-64
Column: Kaseisorb LC-NH2, Super, 6 mm (diameter)× 250 mm
Solvent: 60% acetonitrile
Flow rate: 1.0 ml/min
Retention time of Ts-G2-β-CD: 4.7 min Instruments of preparative HPLC and condition in use:
Apparatus: Shimadzu Corporation, LC-64
Column: 40 mm (diameter)×1,000 mm
Filler: Fuji Chemical Industry Co., Ltd., NH-DU 3050
Solvent: 60% acetonitrile
Flow rate: 30 ml/min Mass spectrometry:
Matrix: DHBA (Gentisic acid)
[M+1+Na]$^+$: 1637, [M-Glu(glucosyl group)+Na]$^+$: 1438 (See FIG. 10)

Figure 11A:
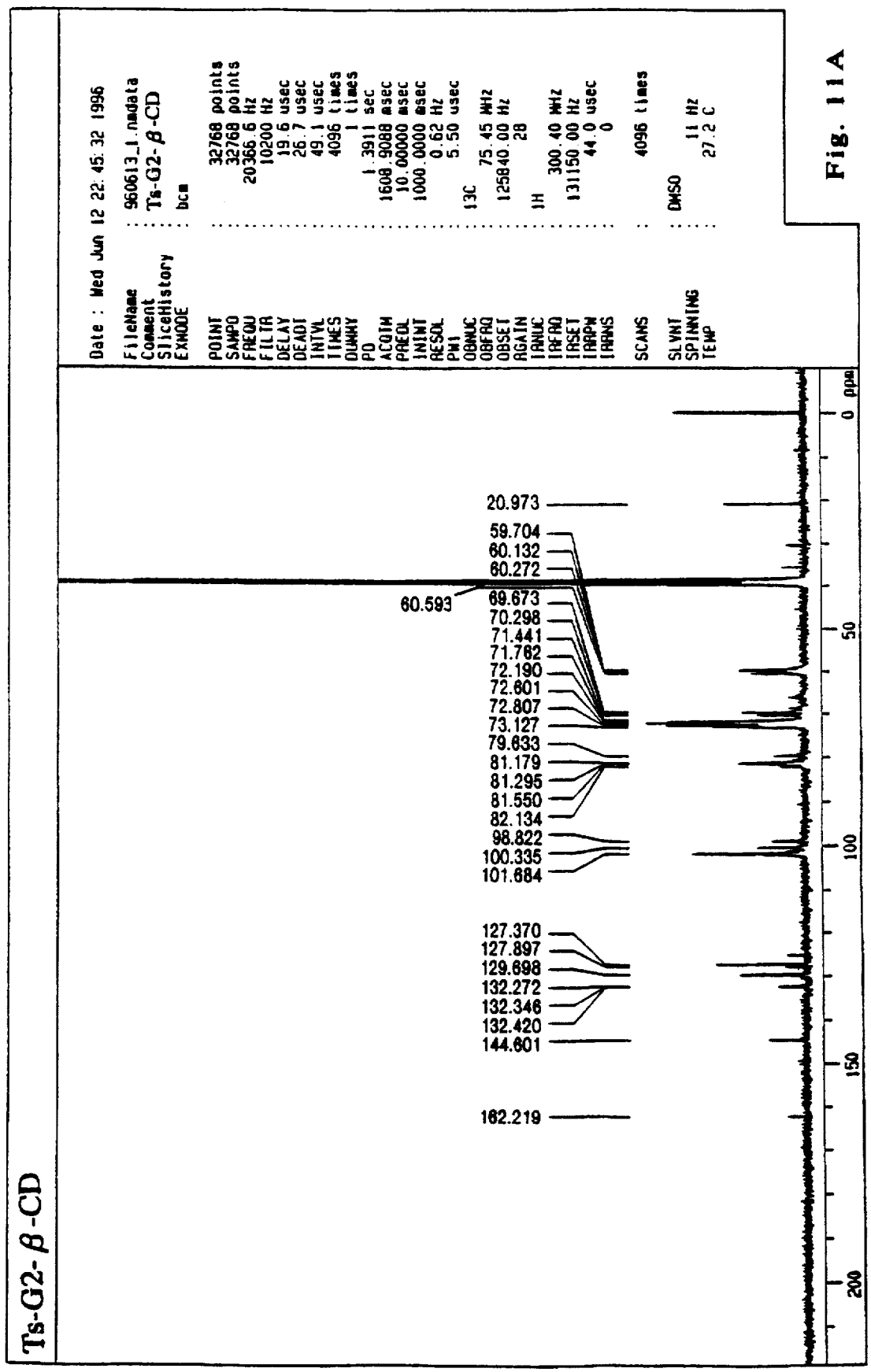
FIG. 11 shows a $^{13}$C-NMR chart of mono-6-O-(4-toluenesulfonyl)-6-deoxy-(maltosyl)-β-cyclodextrin(Ts-G2-β-CD).
Figure 11B:
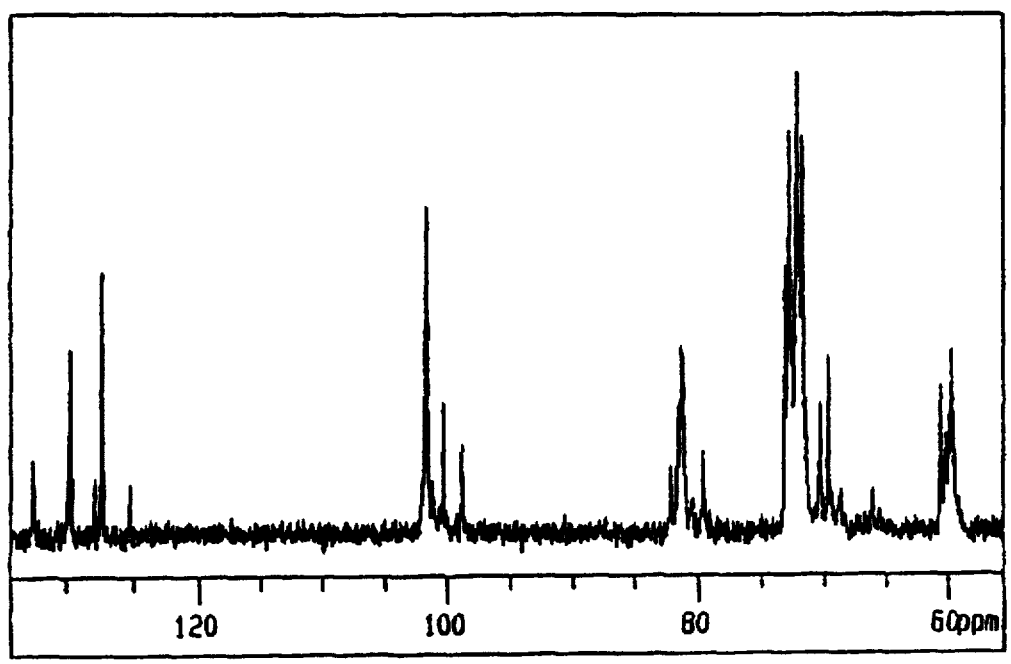

NMR analysis:
13C (DMSO-d$_6$, TMS, δ ppm): 21.0 (methyl of tosyl group, see FIG. 11)

EXAMPLE 14

Synthesis of mono-6-azido-6-deoxy-(maltosyl)-β-cyclodextrin (N3-G2-β-CD)

Into a mixture of 100 ml of dimethylformamide and 10 ml of water, 8.2 g (5.1 mmol) of the monotosyl derivative obtained by Example 13 and 2.0 g (30.8 mmol) of sodium azide were dissolved. While being stirred, the mixture was heated to 95° to 100° C. As the reaction was traced by HPLC, about 3 hours thereafter, when the peak of the monotosyl derivative disappeared and a new peak was generated at a retention time of 4.9 minutes, the reaction was terminated. Then, the solvent was removed by evaporation, and from the resulting syrup-like residue, p-toluenesulfonic acid was isolated and removed by preparative HPLC. The remainder was freeze-dried, whereby 6.5 g (yield: 86%) of mono-6-azido-6-deoxy-(maltosyl)-β-cyclodextrin were obtained.

Figure 12:
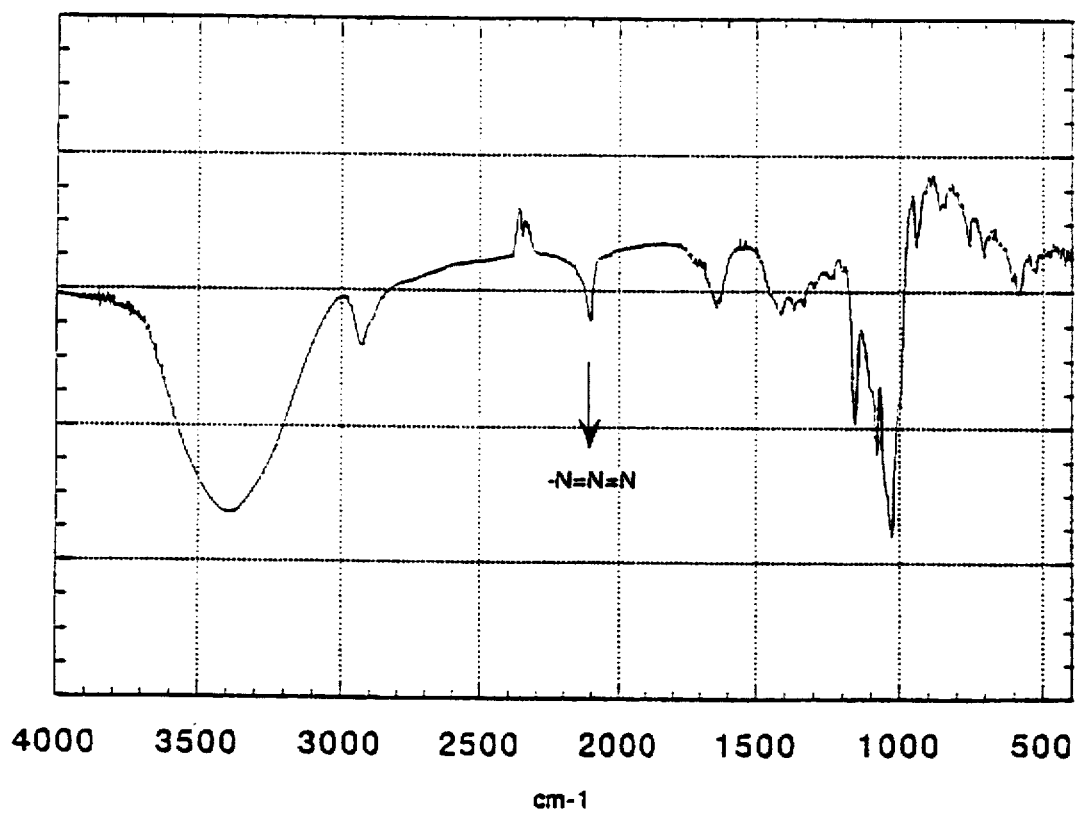
FIG. 12 shows a IR chart of mono-6-azido-6-deoxy-(maltosyl)-β-cyclodextrin(N3-G2-β-CD).

Instruments of analysis HPLC and condition in use:
Apparatus: Shimadzu Corporation Co., Ltd., LC-64
Detection: Refractive index detector RID-64
Column: Kaseisorb LC-NH2, Super, 6 mm (diameter)× 250 mm
Solvent: 60% acetonitrile
Flow rate: 1.0 ml/min
Retention time of N3-G2-β-CD: 4.9 min Instruments of preparative HPLC-and condition in use:
Apparatus: Shimadzu Corporation, LC-64
Column: 40 mm (diameter)×1,000 mm
Filler: Fuji Chemical Industry Co., Ltd., NH-DU 3050
Solvent: 60% acetonitrile
Flow rate: 30 ml/min IR analysis: 2,100 cm$^{-1}$ (azido group) (See FIG. 12)

Figure 13:
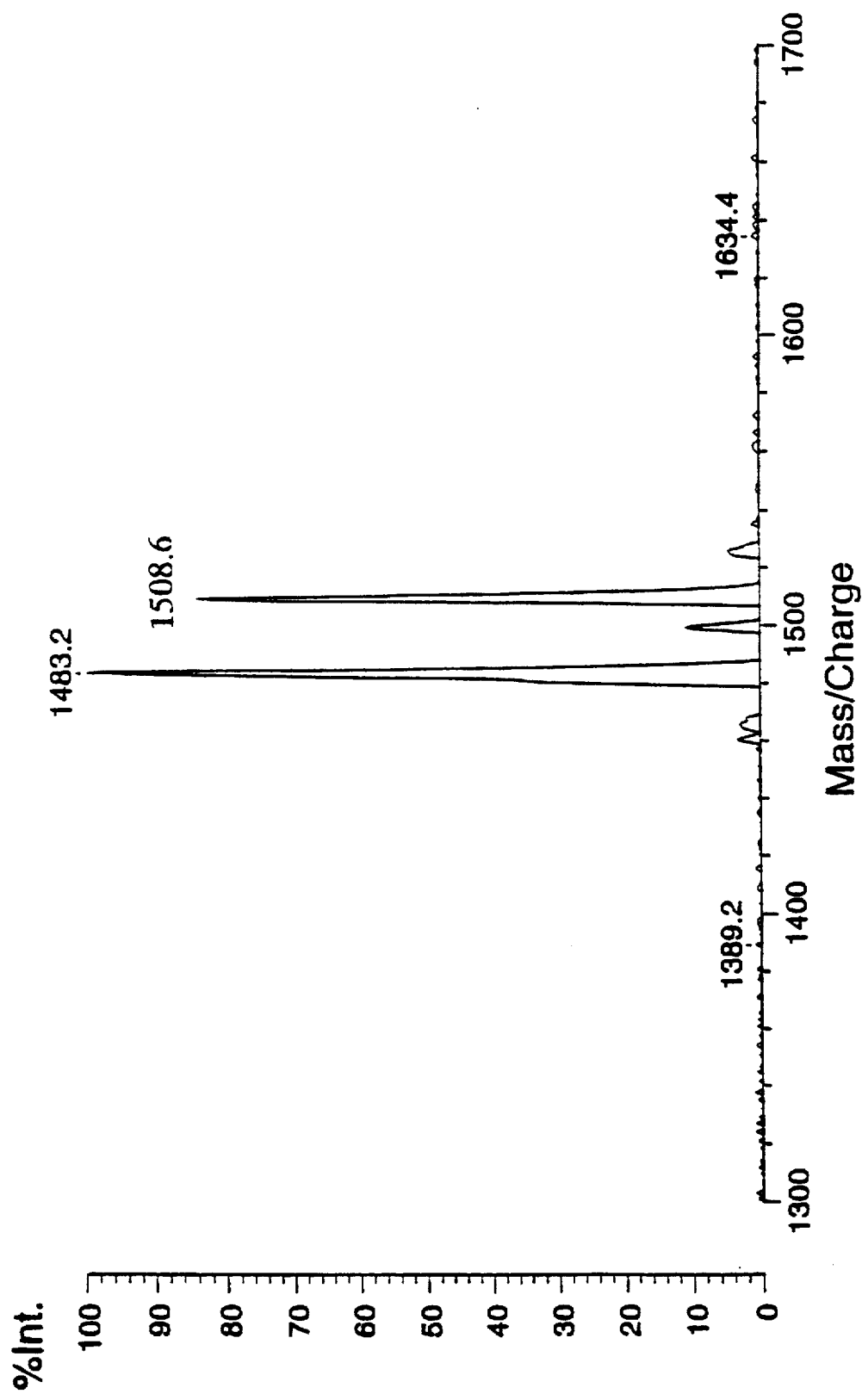
FIG. 13 shows a TOFMS chart of mono-6-azido-6-deoxy-(maltosyl)-β-cyclodextrin(N3-G2-β-CD).

Mass spectrometry:
Matrix: DHBA (Gentisic acid)
[M+Na]$^+$: 1483, [M+1+Na]$^+$: 1509, (see FIG. 13)

Figure 14:
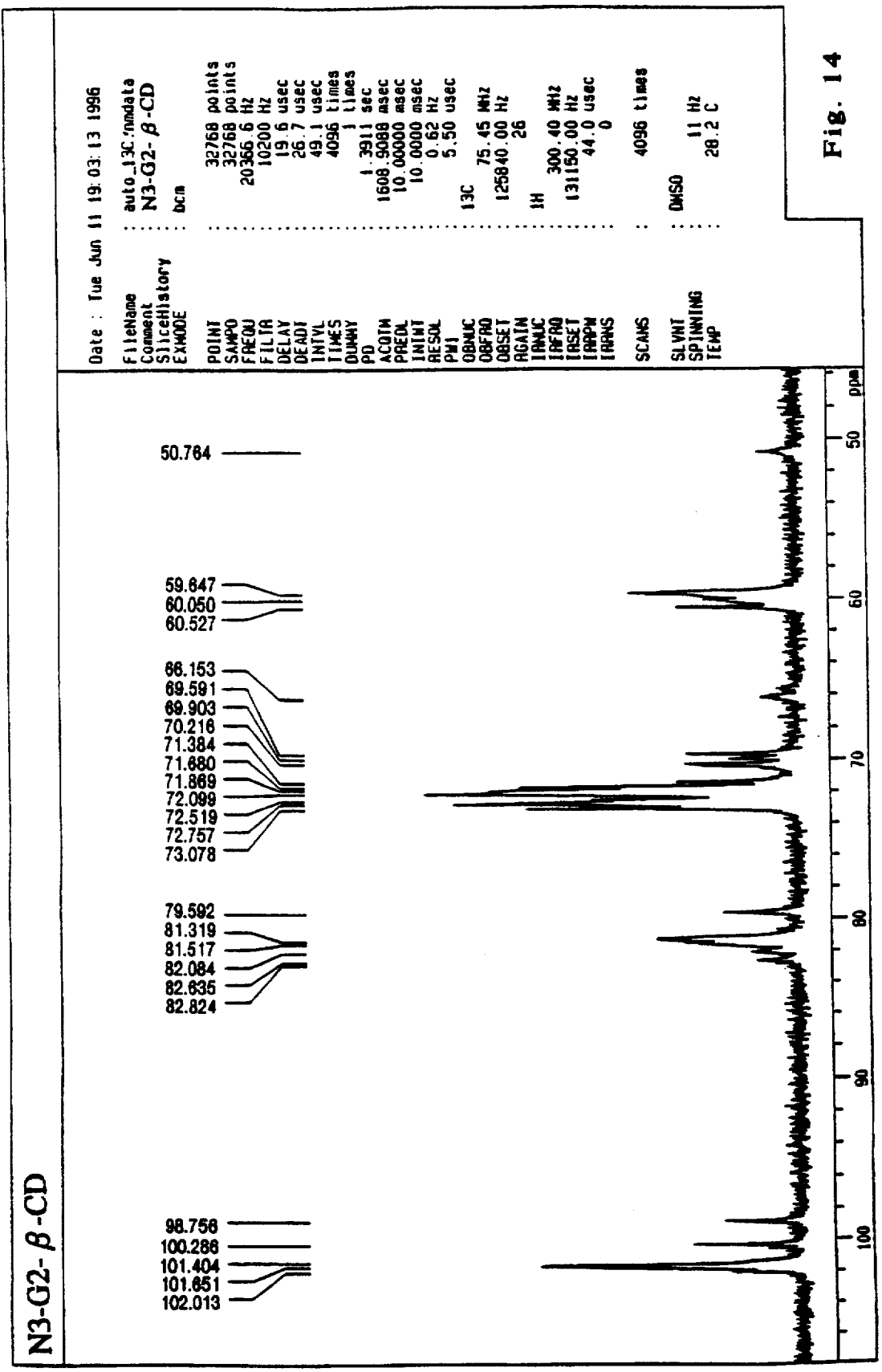
FIG. 14 shows a $^{13}$C-NMR chart of mono-6-azido-6-deoxy-(maltosyl)-β-cyclodextrin(N3-G2-β-CD).

NMR analysis:
$^{13}$C (DMSO-d$_6$, TMS, δ ppm): (see FIG. 14)

EXAMPLE 15

Synthesis of mono-6-amino-6-deoxy-(maltosyl)-β-cyclodextrin (NH2-G2-β-CD)

Into 200 ml of water, 6.2 g (4.2 mmol) of the monoazide derivative obtained by Example 14 were dissolved. To this mixture, 1.5 g of palladium carbon (manufactured by Wako Pure Chemicals Corporation) were added and, while the mixture was rigorously stirred, hydrogen gas was supplied. As the reaction was monitored by HPLC, it was confirmed that the peak of the azide derivative had disappeared in about 2 hours and thus the reaction had been completed. The reaction liquid became positive in ninhydrin coloring.

After the catalyst was removed by filtration under reduced pressure, the filtrate was concentrated under reduced pressure and then freeze-dried, whereby 5.7 g (yield: 94%) of mono-6-amino-6-deoxy-(maltosyl)-β-cyclodextrin were obtained.

Analysis HPLC condition:
Apparatus: Shimadzu Corporation, LC-64
Detection: Refractive index detector RID-64
Column: Kaseisorb-LC-NH2, Super, 6 mm (diameter)× 250 mm
Solvent: 60% acetonitrile
Flow rate: 1.0 ml/min
Retention time of NH2-G2-γ-CD: 3.2 min Mass spectrometry:
Matrix: DHBA
[M+Na]$^+$: 1482, [M-Glu(glucosyl group)]$^+$: 1319

Figure 15:
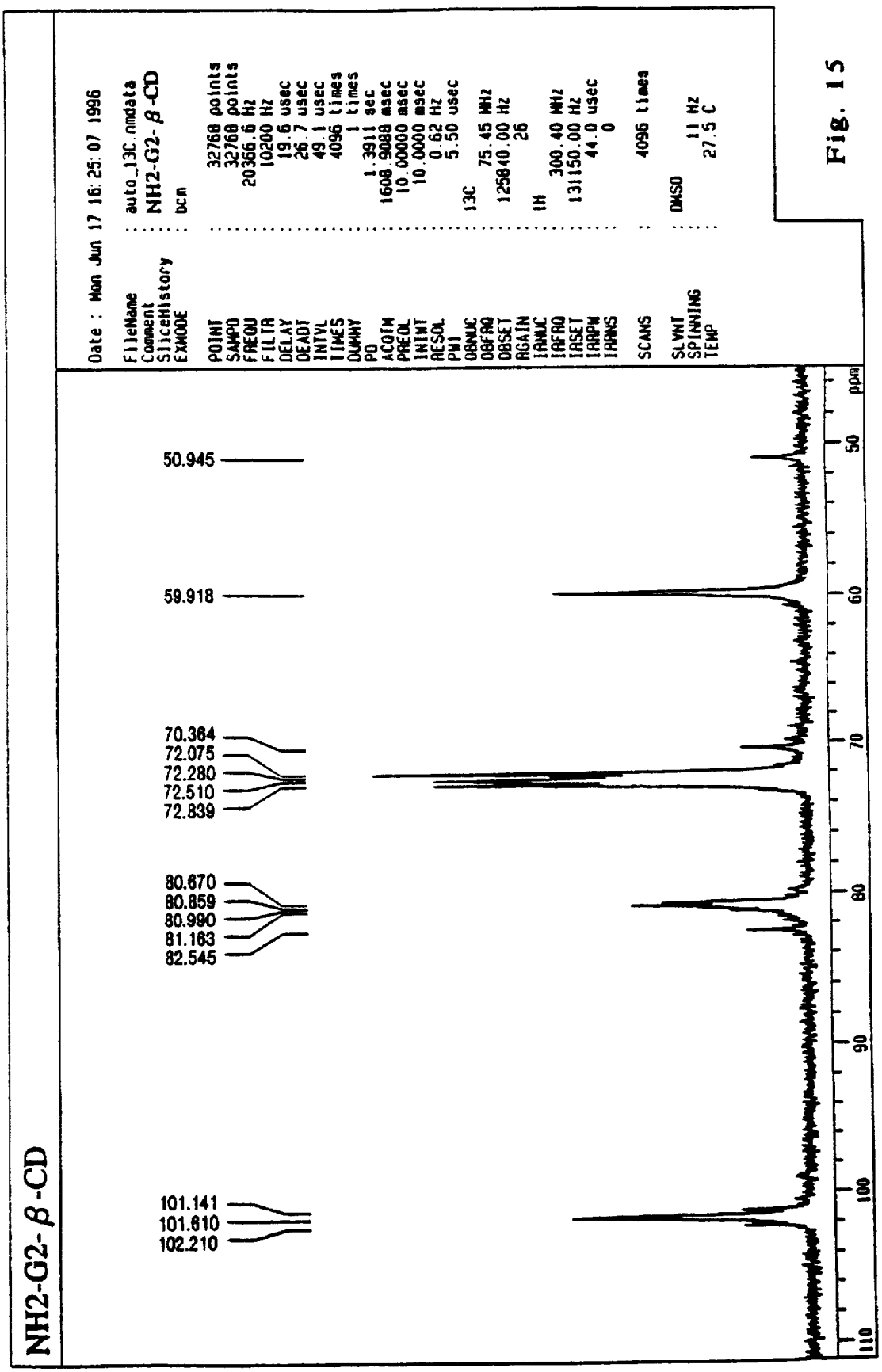
FIG. 15 shows a $^{13}$C-NMR chart of mono-6-amino-6-deoxy-(maltosyl)-β-cyclodextrin(NH2-G2-β-CD).

NMR analysis: See FIG. 15.

EXAMPLE 16

Synthesis of mono-6-isothiocyanato-6-deoxy-maltosyl-β-cyclodextrin (NCS-G2-β-CD)

Into 100 ml of DMF, 5.7 g (4.2 mmol) of the monoamino derivative obtained by Example 15 were dissolved, and 0.5 ml (about 8 mmol) of carbon disulfide was added thereto. The resulting solution was cooled to 0° C. and, while being stirred, 0.97 g (4.7 mmol) of dicyclohexylcarbodiimide in DMF solution was added dropwise thereto in about 1 hour. After being stirred at 0° C. for 6 hours, the mixture was returned to room temperature and then continuously stirred overnight as it was. It was confirmed that the reaction liquid was negative in terms of ninhydrin coloring. After the reaction, it was confirmed by HPLC analysis that a new peak had been detected at a retention time of 5.0-minutes.

The reaction liquid was concentrated. Water was added to the resulting syrup-like residue, and the mixture was left overnight at room temperature. The crystal precipitated thereby was filtered out. The filtrate was further concentrated, dissolved into a solvent in which acetonitrile/water=3:2, and then purified by preparative HPLC, whereby 3.45 g (yield: 59%) of mono-6-isothiocyanato-6-deoxy-maltosyl-β-cyclodextrin were obtained.

Figure 16A:
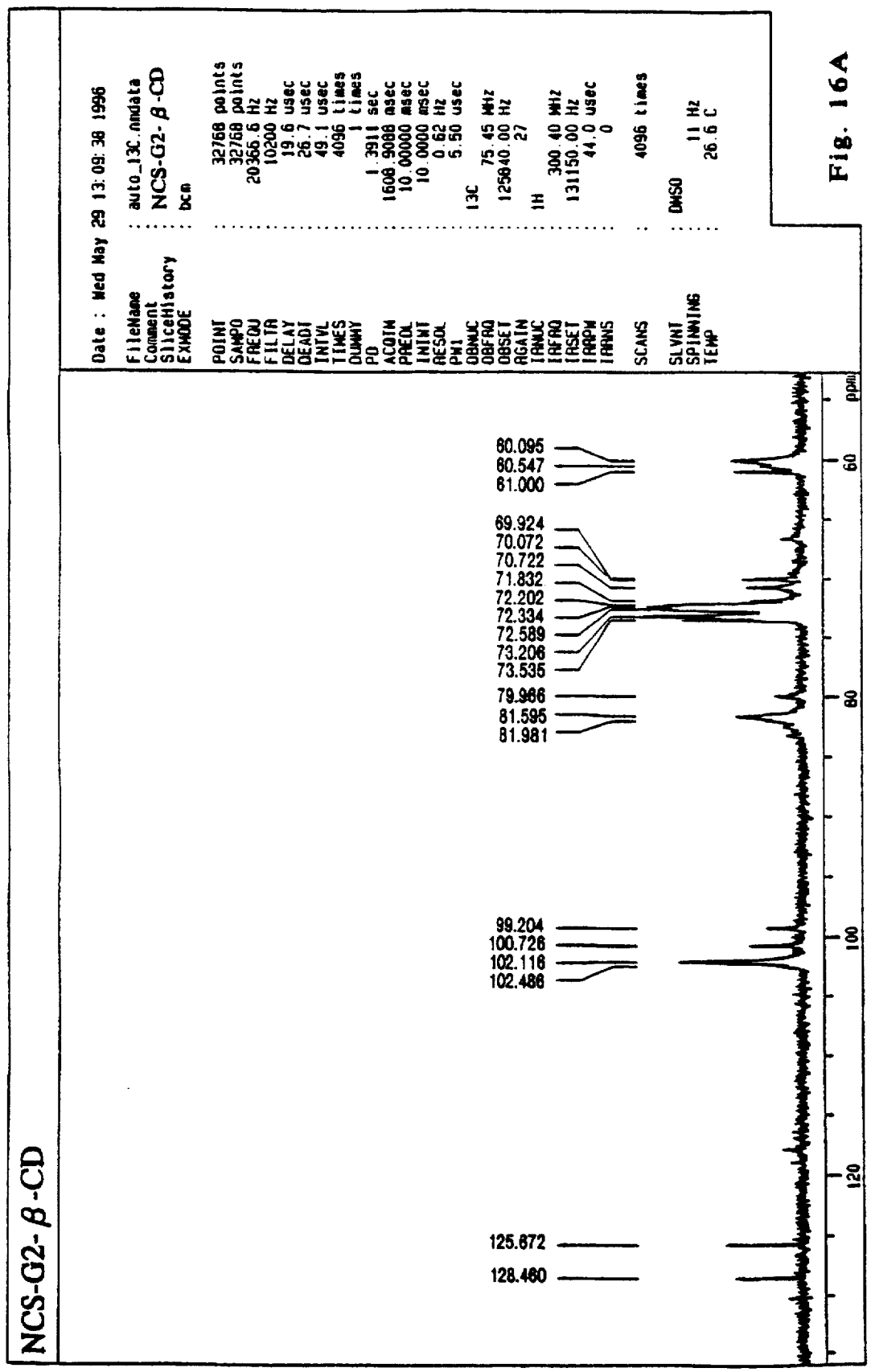
FIG. 16 shows a $^{13}$C-NMR chart of mono-6-isothiocyanato-6-deoxy-(maltosyl)-β-cyclodextrin(NCS-G2-β-CD).
Figure 16B:
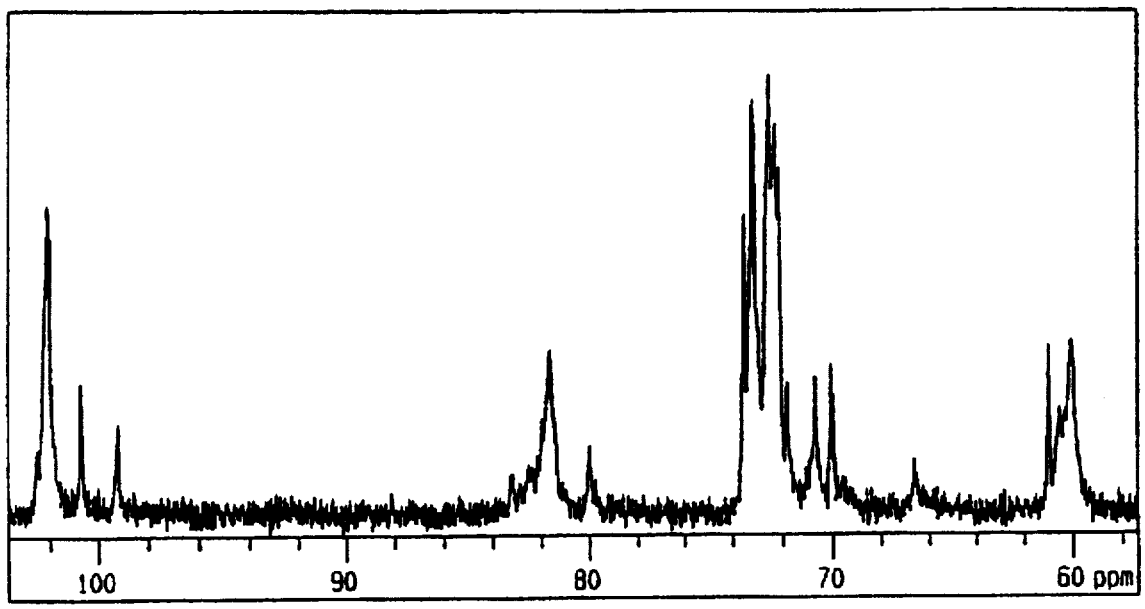

The thus obtained product were dried under reduced pressure and then subjected to NMR measurement in DMSO (See FIG. 16). A signal derived from C6, a signal derived from C2, C3, and C4, a signal derived from C5, and a signal derived from C1 were confirmed at 61.0 to 60.1 ppm, 73.5 to 66.7 ppm, 83.2 to 79.8 ppm, and 102.1 to 99.2 ppm, respectively (see formula (III)).

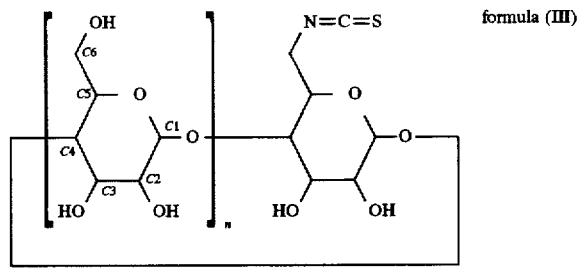

Further, two signals were newly confirmed at 128 to 126 ppm and found to belong to the carbon of the isothiocyanato group. Thus, at least two signals were confirmed under this experimental condition, thereby indicating that there was a mixture of an isothiocyanato group substituted for a primary hydroxyl group of glucose at a cyclic portion and an isothiocyanato group substituted for a primary hydroxyl group of glucose at a branch portion.

Figure 17:
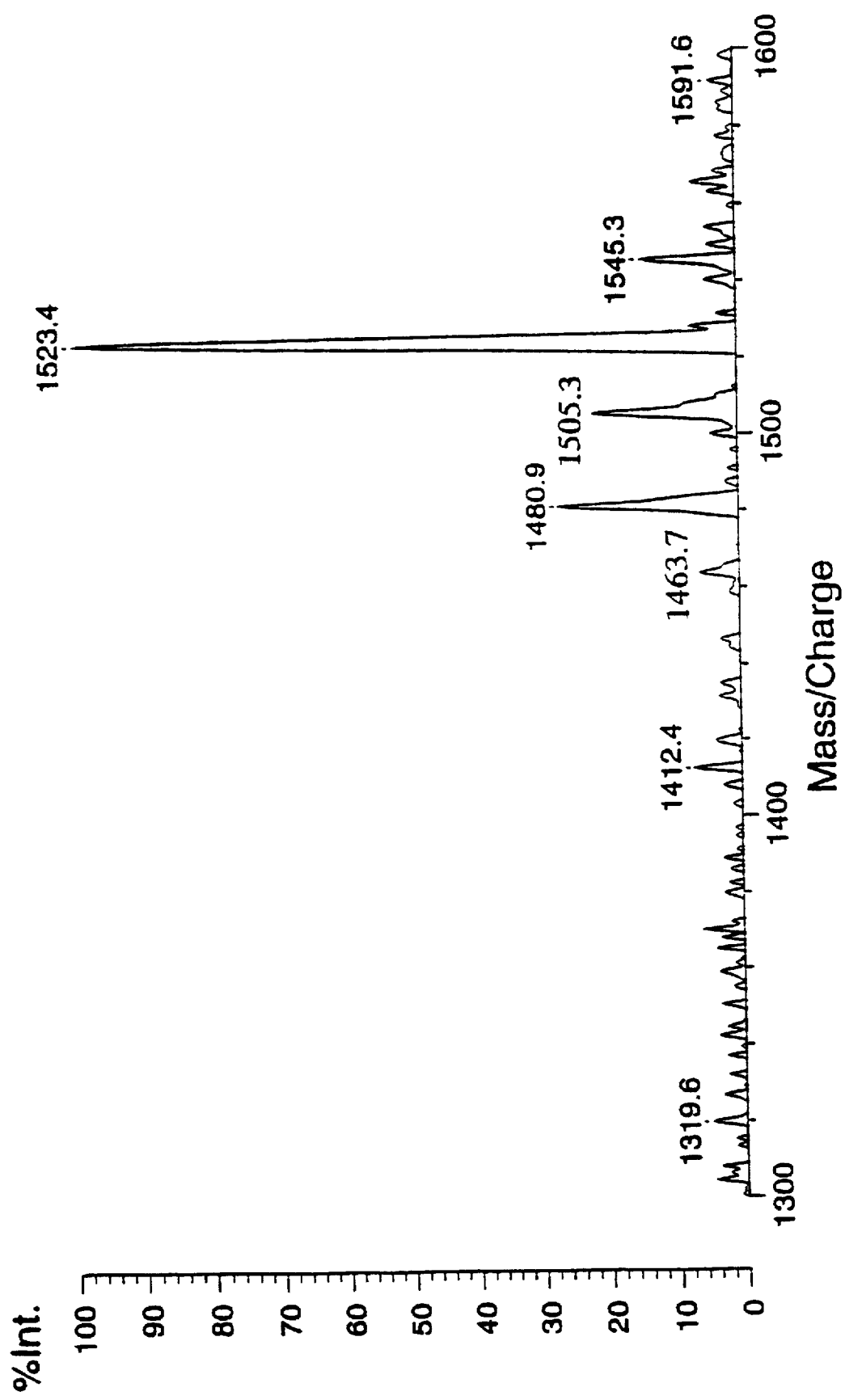
FIG. 17 shows a TOFMS chart of mono-6-isothiocyanato-6-deoxy-(maltosyl)-β-cyclodextrin(NCS-G2-β-CD).

Instruments of HPLC analysis and condition in use:
  Apparatus: Shimadzu Corporation, LC-64
  Detection: Refractive index detector RID-64
  Column: Kaseisorb LC-NH2, Super, 6 mm (diameter)× 250 mm
  Solvent: 60% acetonitrile
  Flow rate: 1.0 ml/min
Instruments of preparative HPLC and condition in use:
  Apparatus: Shimadzu Corporation, LC-64
  Column: 40 mm (diameter)×1,000 mm
  Filler: Fuji Chemical Industry Co., Ltd., NH-DU 3050
  Solvent: 60% acetonitrile
  Flow rate: 30 ml/min
Mass spectrometry:
  Matrix: DHBA (Gentisic acid)
  $[M+Na]^+$: 1,523, $[(M-HNCS)+Na]^+$: 1,464, $[NH2-G2-β-CD(hydrolysis product)]^+$: 1481, $[M-H2O+Na]^+$: 1505 (See FIG. 17)

EXAMPLE 17

Synthesis of mono-6-O-(4-toluenesulfonyl)-6-deoxy-(glucosyl)-β-cyclodextrin (Ts-G1-β-CD)

In an atmosphere of nitrogen, while 30 g (23.1 mmol) of glucosyl-β-cyclodextrin in 300 ml of pyridine were stirred at room temperature, 6.61 g (34.7 mmol) of p-toluenesulfonyl chloride were added thereto in several portions. The resulting mixture was stirred overnight at room temperature as it was. Thereafter, the solvent was removed under reduced pressure, whereby a syrup-like raw product was obtained. Upon HPLC analysis, 4 peaks were observed in this raw product. The first, last, and third peaks were confirmed to be the excess p-toluenesulfonate, unreacted glucosyl-β-cyclodextrin, and main product, respectively. This main product was dispensed and purified by preparative HPLC. From the fraction corresponding to the third peak, i.e., main product or mono-6-O-(4-toluenesulfonyl)-6-deoxy-(glucosyl)-β-cyclodextrin, the solvent was removed under reduced pressure. Then, the remaining aqueous solution was freeze-dried, whereby 11.2 g (yield: 33.4%) of white powder were obtained.

Figure 18:
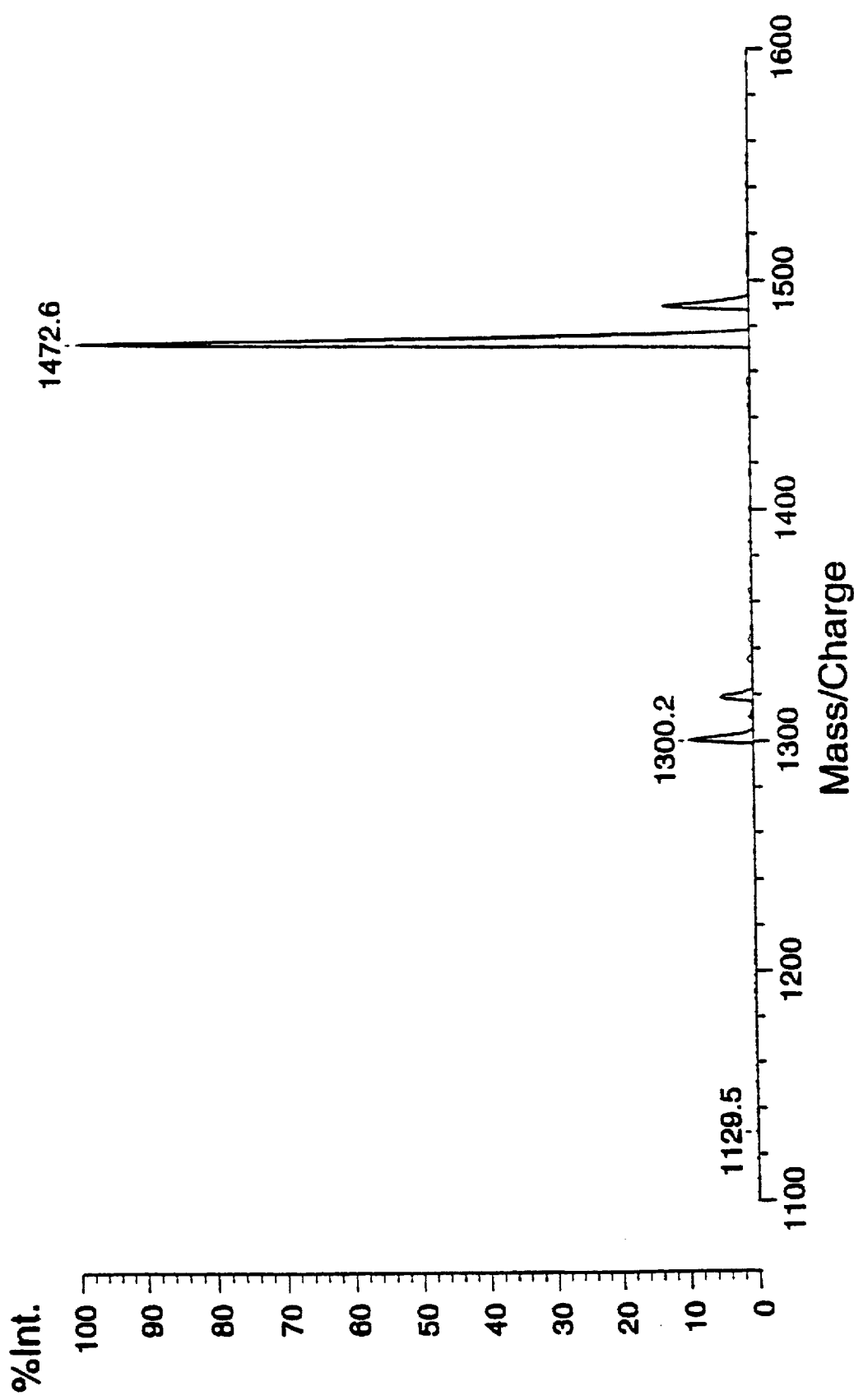
FIG. 18 shows a TOFMS chart of mono-6-O-(4-toluenesulfonyl)-6-deoxy-(glucosyl)-β-cyclodextrin(Ts-G1-β-CD).
Figure 19A:
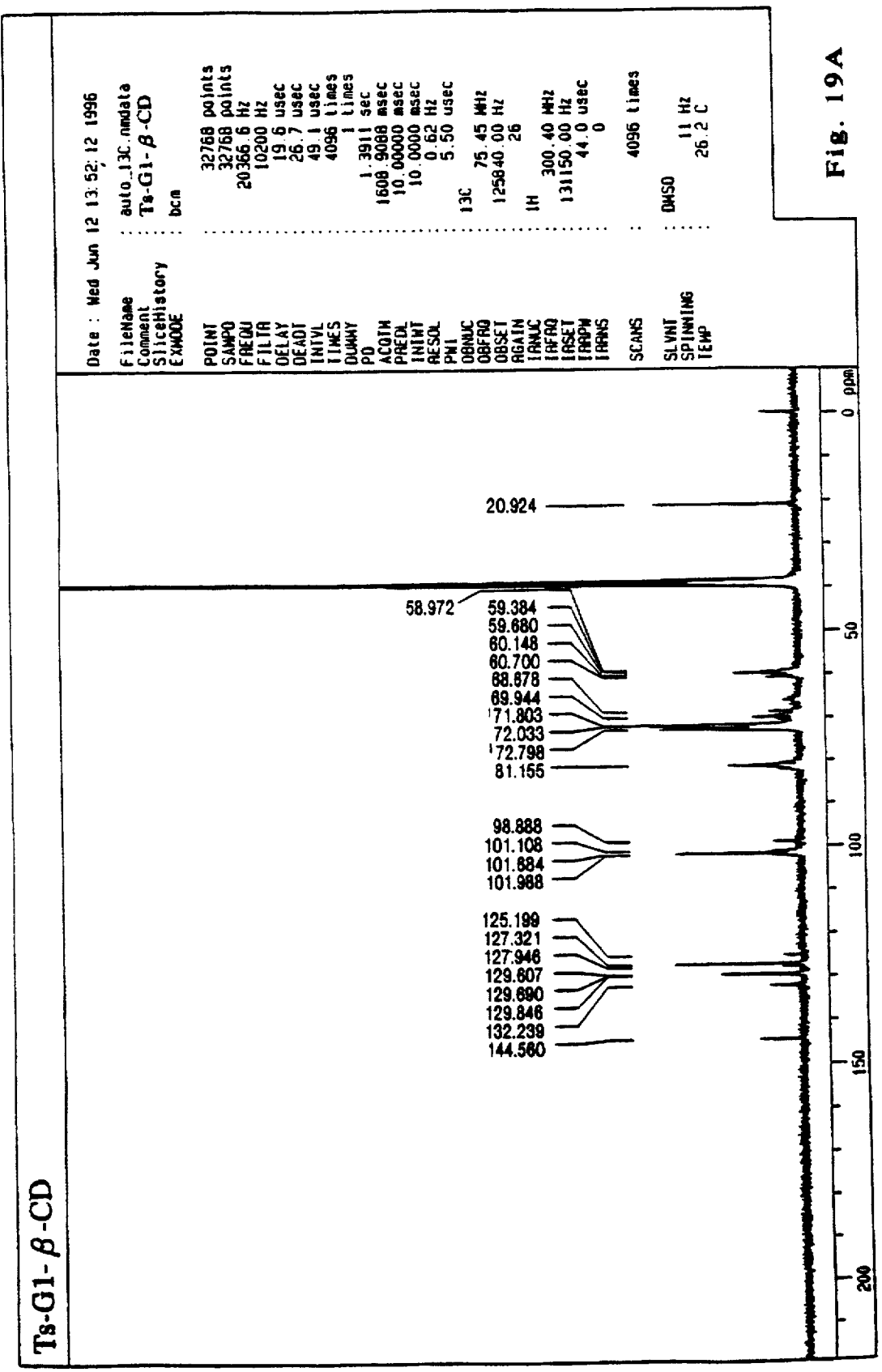
FIG. 19 shows a $^{13}$C-NMR chart of mono-6-O-(4-toluenesulfonyl)-6-deoxy-(glucosyl)-β-cyclodextrin(Ts-G1-β-CD).
Figure 19B:
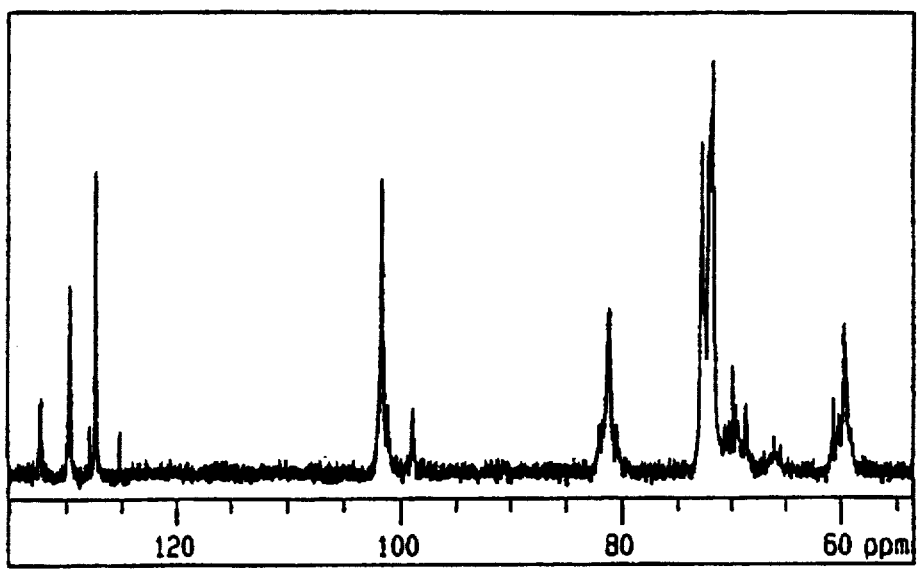

Instruments of HPLC analysis and condition in use:
  Apparatus: Shimadzu Corporation, LC-64
  Detection: Refractive index detector RID-64
  Column: Kaseisorb LC-NH2, Super, 6 mm (diameter)× 250 mm
  Solvent: 60% acetonitrile
  Flow rate: 1.0 ml/min
  Retention time of Ts-G1-β-CD: 5.0 min
Instruments of preparative HPLC and condition in use:
  Apparatus: Shimadzu Corporation, LC-64
  Column: 40 mm (diameter)×1,000 mm
  Filler: Fuji Chemical Industry Co., Ltd., NH-DU 3050
  Solvent: 60% acetonitrile
  Flow rate: 30 ml/min
Mass spectrometry:
  Matrix: DHBA (Gentisic acid)
  $[M-1+Na]^+$: 1473, $[(M-Glu+Na]^+$: 1300, (see FIG. 18)
NMR analysis:
  $^{13}C$ (DMSO-$d_6$, TMS, δ ppm): 21.0 (methyl group of tosyl) (see $^{13}C$-NMR chart a in FIG. 19)

EXAMPLE 18

Synthesis of mono-6-azido-6-deoxy-(glucosyl)-β-cyclodextrin (N3-G1-β-CD)

Into a mixture of 100 ml of dimethylformamide and 10 ml of water, 11.0 g (7.58 mmol) of monotosyl derivative obtained by Example 17 and 1.5 g (23 mmol) of sodium azide were dissolved. While being stirred, the mixture was heated to 95° to 100° C. As the reaction was monitored by HPLC, about 3 hours thereafter, when the peak corresponding to the monotosyl derivative disappeared and a new peak was observed at a retention time of 4.9 minutes, the reaction was terminated. Then, the solvent was removed by evaporation, and from the resulting syrup-like residue, p-toluenesulfonic acid was isolated and removed by preparative HPLC. The remainder was freeze-dried, whereby 9.5 g (yield: 95%) of mono-6-azido-6-deoxy-(glucosyl)-β-cyclodextrin were obtained.

Instruments of analysis HPLC and condition in use:
  Apparatus: Shimadzu Corporation, LC-64
  Detection: Refractive index detector RID-64
  Column: Kaseisorb LC-NH2, Super, 6 mm (diameter)× 250 mm
  Solvent: 60% acetonitrile
  Flow rate: 1.0 ml/min
  Retention time of N3-G1-β-CD: 4.9 min
Instruments of preparative HPLC and condition in use:
  Apparatus: Shimadzu Corporation, LC-64
  Column: 40 mm (diameter)×1,000 mm Filler: Fuji Chemical Industry Co., Ltd., NH-DU 3050
Solvent: 60% acetonitrile
Flow rate: 30 ml/min
IR analysis: 2,100 cm$^{-1}$ (azido group)
Mass spectrometry analysis:
Matrix: DHBA (Gentisic acid)
[M+Na]$^+$: 1345

EXAMPLE 19

Synthesis of mono-6-amino-6-deoxy-(glucosyl)-β-cyclodextrin (NH2-G1-β-CD)

Into 200 ml of water, 8.7 g (6.56 mmol) of the monoazide derivative obtained by Example 18 were dissolved. To this mixture, 800 mg of palladium on carbon (manufactured by Wako Pure Chemicals Corporation) were added and, while the mixture was rigorously stirred, hydrogen gas was introduced. As the reaction was monitored by HPLC, it was confirmed that the peak corresponding to azide derivative had disappeared in about 2 hours and thus the reaction had been completed. The reaction solution became positive in ninhydrin coloring.

After the catalyst was removed by filtration under reduced pressure, the filtrate was concentrated under reduced pressure and then freeze-dried, whereby 8.04 g (yield: 91.5%) of mono-6-amino-6-deoxy-(glucosyl)-β-cyclodextrin were obtained.

Mass spectrometry:
Matrix: DHBA (Gentisic acid)
[M+1+Na]$^+$: 1320

EXAMPLE 20

Synthesis of mono-6-isothiocyanato-6-deoxy-glucosyl-β-cyclodextrin (NCS-G1-β-CD)

Into 100 ml of DMF, 8.04 g (6.02 mmol) of the monoamino derivative obtained by Example 19 were dissolved, and 1.0 ml (about 16 mmol) of carbon disulfide was added thereto. The resulting solution was cooled to 0° C. and, while being stirred, 1.38 g (7.22 mmol) of N-ethyl-N'-(N,N-dimethyl-3-aminopropyl)-carbodiimide hydrochloride in DMF solution were added dropwise thereto in over about 1 hour. Thereafter, the mixture was returned to room temperature and then continuously stirred overnight.

The reaction solution was concentrated, and the resulting syrup-like residue was dissolved in a small amount of DMF. Then, a large excess amount of acetone was added thereto, whereby a precipitate was formed. This precipitate was dissolved in water, applied to a Sephadex G-25 column (20 mm×200 mm), and then eluted with water, whereby brown impurities were removed, being absorbed by the resin. A transparent pale yellow eluate was collected and freeze-dried, whereby 2.51 g (yield: 31%) of mono-6-isothiocyanato-6-deoxy-glucosyl-β-cyclodextrin were obtained as yellow powder.

Figure 20A:
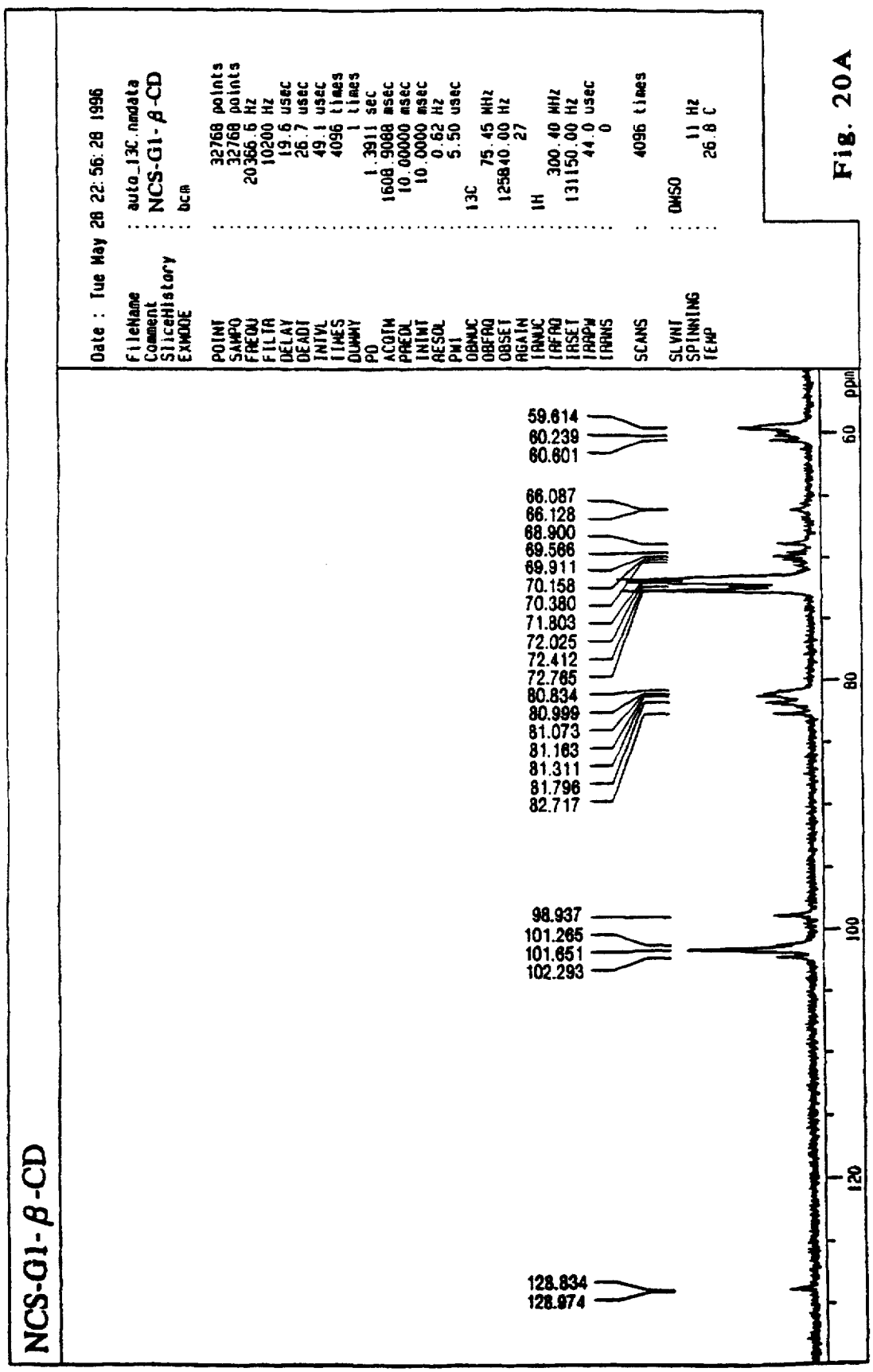
FIG. 20 shows a $^{13}$C-NMR chart of mono-6-isorhiocyanato-6-deoxy-(glucosyl)-β-cyclodextrin(NCS-G1-β-CD).
Figure 20C:
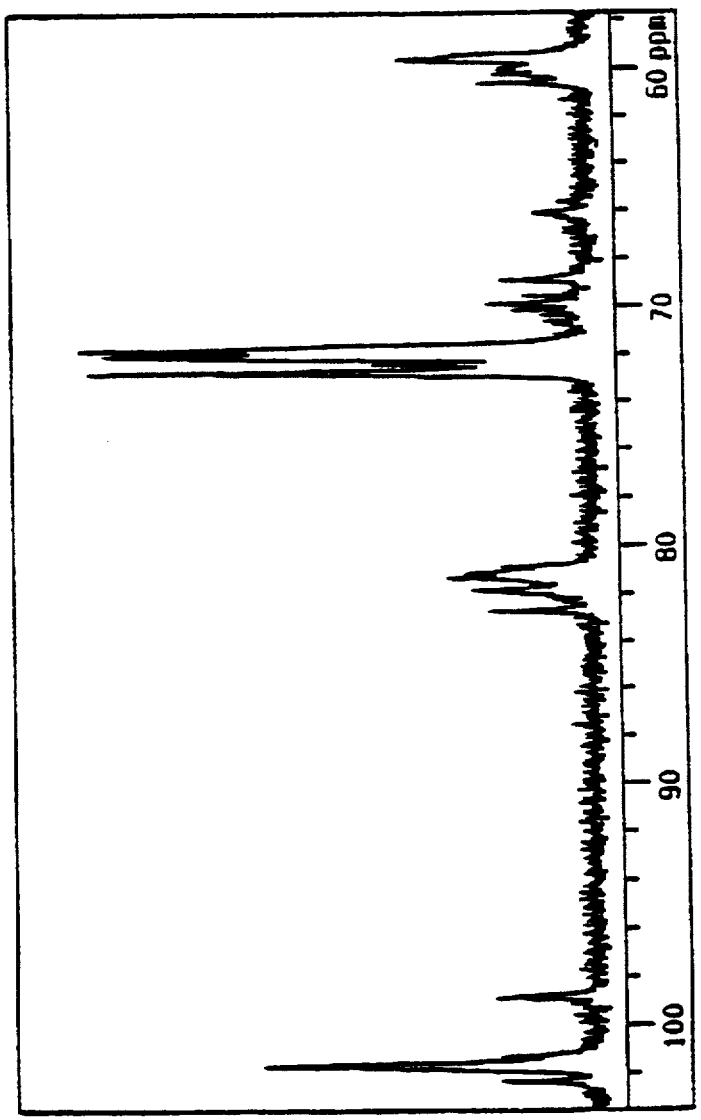
Figure 20B:
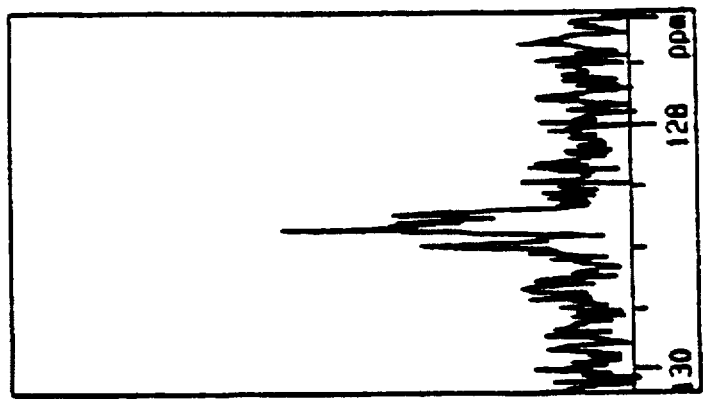

The HPLC analysis of the above-mentioned product after purification confirmed a new peak at a retention time of 5.7 minutes. Also, according to NMR measurement(see FIG. 20), a signal derived from C6, a signal derived from C2, C3, and C4, a signal derived from C5, and a signal derived from C1 were confirmed at 60.6 to 59.6 ppm, 72.8 to 66.4 ppm, 82.7 to 80.8 ppm, and 102.3 to 98.9 ppm, respectively (see formula (III)).

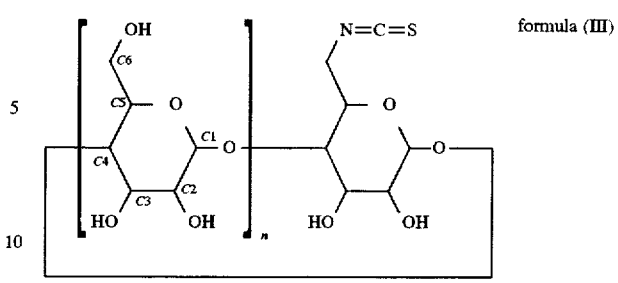

formula (III)

Further, two signals were newly confirmed at 129.0 to 128.8 ppm and found to belong to the carbon of to isothiocyanato group. Accordingly, this product is a mixture in which the isothiocyanato group substituted for the primary hydroxyl group of glucose at the cyclic portion and the isothiocyanato group substituted for the primary hydroxyl group of glucose at the branch portion is about 1:1.

Figure 21:
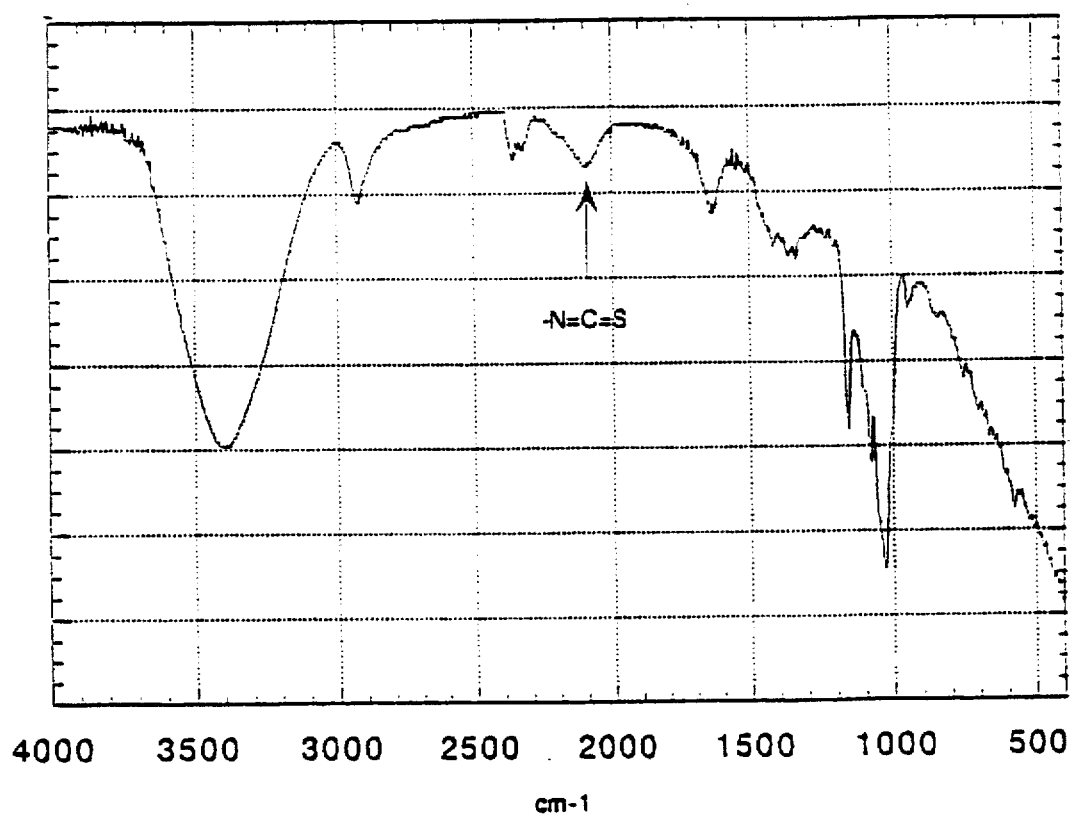
FIG. 21 shows a IR chart of mono-6-isorhiocyanato-6-deoxy-(glucosyl)-β-cyclodextrin(NCS-G1-β-CD).
Figure 22:
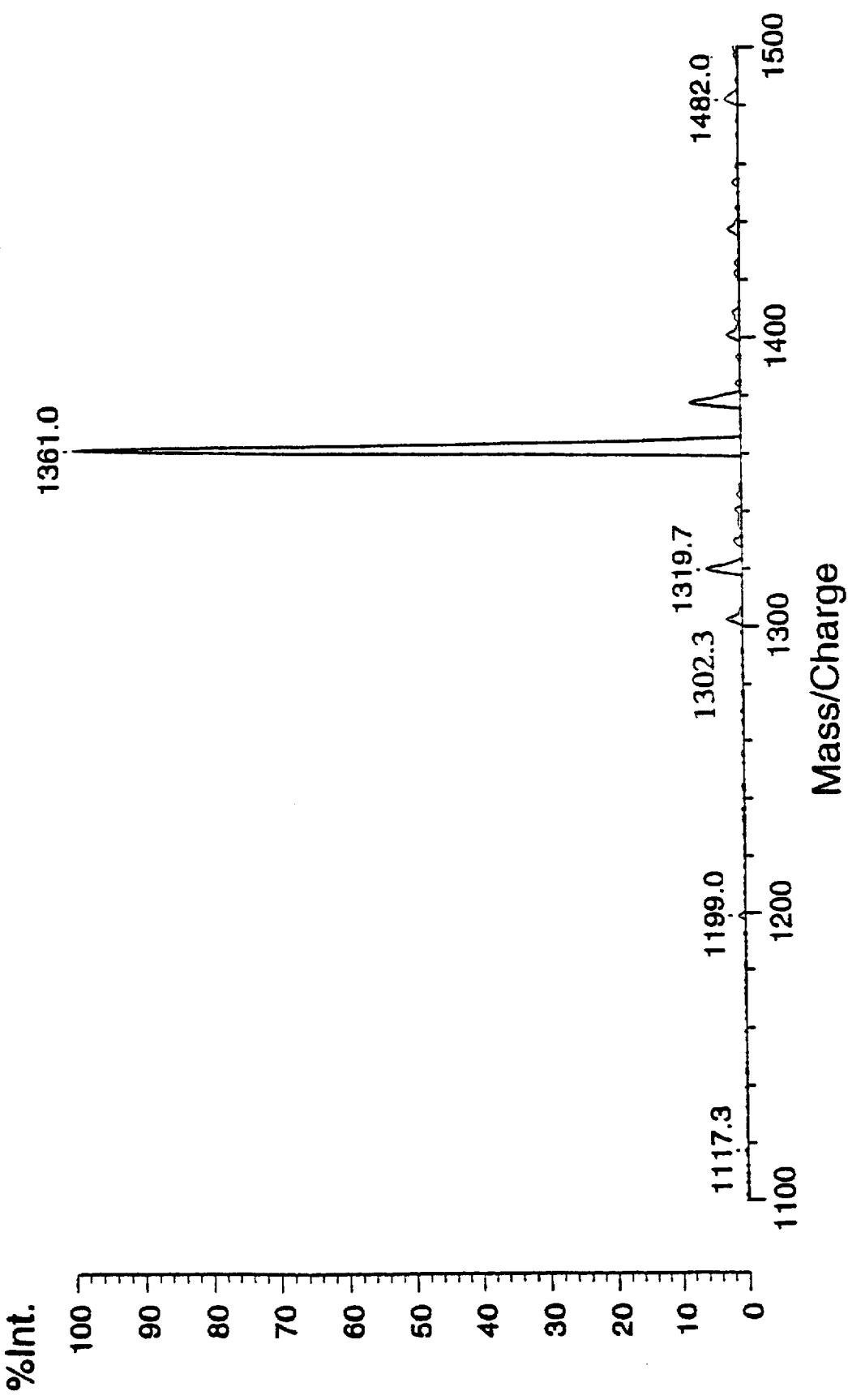
FIG. 22 shows a TOFMS chart of mono-6-isorhiocyanato-6-deoxy-(glucosyl)-β-cyclodextrin(NCS-G1-β-CD).

Conditions of analysis HPLC:
Apparatus: Shimadzu Corporation, LC-64
Detection: Refractive index detector RID-64
Column: Kaseisorb LC-NH2, Super, 6 mm (diameter)× 250 mm
Solvent: 60% acetonitrile
Flow rate: 1.0 ml/min
Preparative HPLC:
Apparatus: Shimadzu Corporation, LC-64
Column: 40 mm (diameter)×1,000 mm
Filler: Fuji Chemical Industry Co., Ltd., NH-DU 3050
Solvent: 60% acetonitrile
Flow rate: 30 ml/min
IR analysis: 2,100 cm$^{-1}$ (isothiocyanato group, see FIG. 21)
Mass spectrometry:
Matrix: DHBA (Gentisic acid)
[M+Na]$^+$: 1361, [(M−HNCS)+Na]$^+$: 1302, [NH2-G1-β-CD(hydrolysis product)+Na]$^+$: 1319 (see FIG. 22)

EXAMPLE 21

Labeling of amino acid with mono-6-isothiocyanato-6-deoxy-α-cyclodextrin

To 1 ml (10 mM) of DMSO solution of mono-6-isothiocyanato-α-cyclodextrin, 1 ml (50 mM, pH 9) of aqueous glycine solution was added. The resulting mixture was stirred overnight at room temperature. The reaction solution was negative in ninhydrin coloring, and a spot different from the isothiocyanato derivative was confirmed. Also, by mass spectrum, the parent peak of the reaction product formed by the isothiocyanato derivative and glycine was confirmed.

Figure 23:
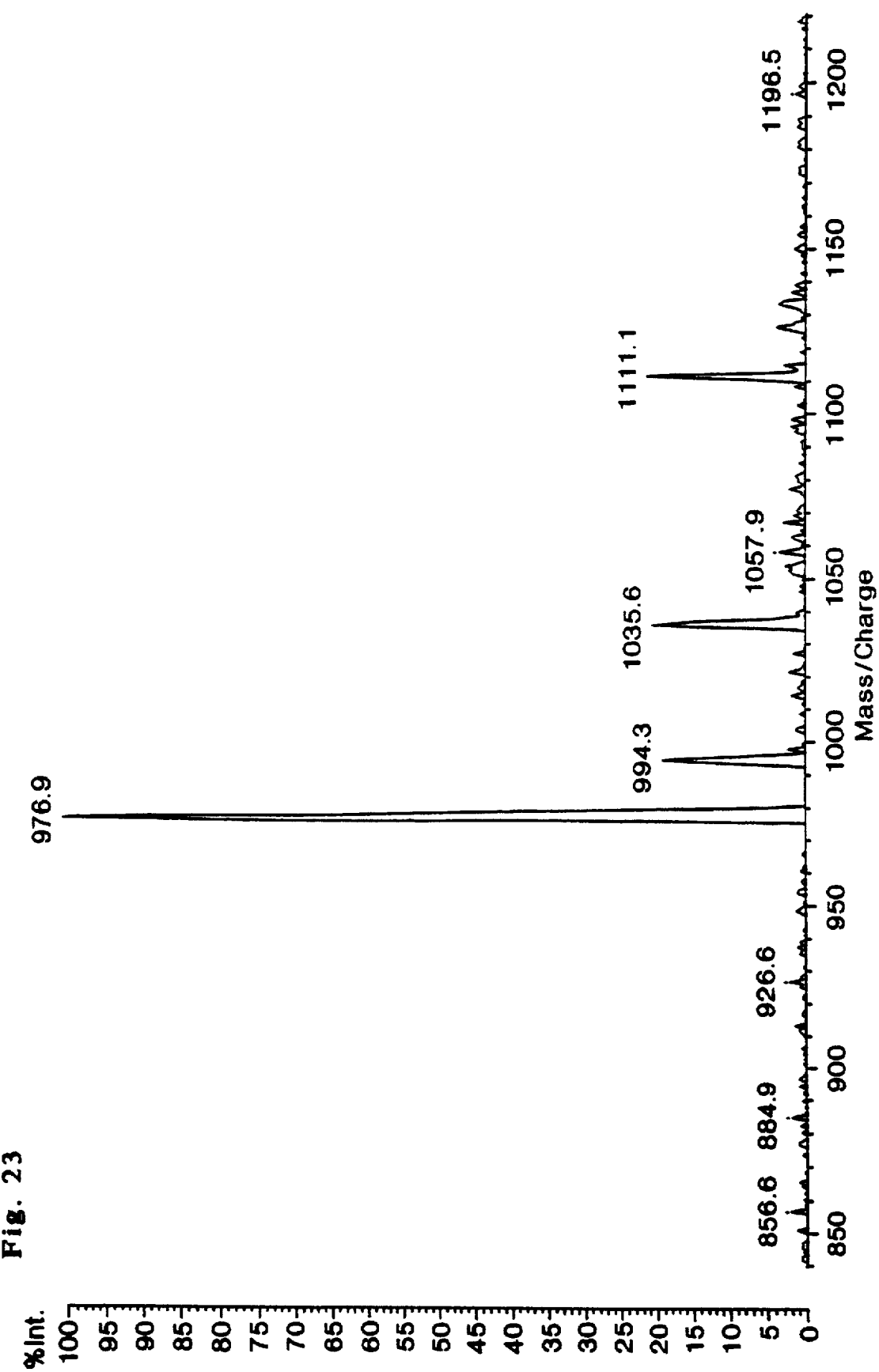
FIG. 23 shows a TOFMS chart of the reaction products of NCS-α-CD and glycine.

TLC analysis condition:
TLC: Merck, HPTLC-Fertigplatten NH$_2$
Solvent: 60% acetonitrile
Detection: diphenylamine/aniline/phosphoric acid/acetone=2:2:15:100
Reaction product: Rf value at 0.47
TLC: Merck, Kieselgel 60 F254
Solvent: chloroform/methanol/water=8:3:1
Detection: ninhydrin coloring
Mass spectrometry:
Matrix: DHBA (Gentisic acid)
[M+Na]$^+$: 1,111, [NCS-α-CD-1+Na]$^+$: 1036, [NCS-α-CD-HNCS-1+Na]$^+$: 977 (See FIG. 23)

EXAMPLE 22

Labeling of benzylamine with mono-6-isothiocyanato-6-deoxy-O-cyclodextrin

To 1 ml (10 mM) of DMSO solution of mono-6-isothiocyanato-6-deoxy-β-cyclodextrin, 0.1 ml (10 mM) of DMSO solution of benzylamine was added. The resulting mixture was stirred overnight at room temperature. The reaction solution was negative in ninhydrin coloring, and a spot different from the isothiocyanato derivative was confirmed. Also, by mass spectrum, the parent peak of the reaction product formed by the isothiocyanato derivative and benzylamine was confirmed.

TLC analysis conditions:
  TLC: Merck, HPTLC-Fertigplatten $NH_2$
  Solvent: 70% acetonitrile
  Detection: diphenylamine/aniline/phosphoric acid/acetone=2:2:15:100
  Reaction product: Rf value at 0.24
Mass spectrometry:
  Matrix: DHBA (Gentisic acid)
  $[M+Na]^+$: 1,305

EXAMPLE 23

Labeling of amino acid with mono-6-isothiocyanato-6-deoxy-γ-cyclodextrin

To 1 ml (0.5 mM, pH 9) of aqueous mono-6-isothiocyanato-6-deoxy-γ-cyclodextrin solution, 0.1 ml (0.5 mM, pH 9) of aqueous L-phenylalanine solution was added. The resulting mixture was stirred overnight at room temperature. The reaction was monitored by TLC. It was confirmed that the spot due to the isothiocyanato derivative had disappeared and that a new spot had been observed at a position different therefrom. The reaction solution was negative in terms of ninhydrin coloring. Also, by mass spectrum, the parent peak of the reaction product formed by the isothiocyanato derivative and phenylalanine was confirmed.

TLC analysis conditions:
  TLC: Merck, HPTLC-Fertigplatten $NH_2$
  Solvent: 60% acetonitrile
  Detection: diphenylamine/aniline/phosphoric acid/acetone=2:2:15:100
  Reaction product: Rf value at 0.35
  TLC: Merck, Kieselgel 60 F254
  Solvent: chloroform/methanol/water=8:3:1
  Detection: ninhydrin coloring
  Ninhydrin coloring test became negative due to the reaction with isothiocyanato group.
Mass spectrometry:
  Matrix: DHBA (Gentisic acid)
  $[M+Na]^+$: 1,527

EXAMPLE 24

Labeling of amino acid with mono-6-isothiocyanato-6-deoxy-γ-cyclodextrin

To 1 ml (10 mM) of DMSO solution of mono-6-isothiocyanato-6-deoxy-γ-cyclodextrin, 1 ml (50 mM, pH 9) of aqueous glycine solution was added. The resulting mixture was stirred overnight at room temperature. The reaction solution was negative in terms of ninhydrin coloring. A new spot was confirmed at a position different from the isothiocyanato derivative. Also, by mass spectrum, the parent peak of the reaction product formed by the isothiocyanato derivative and glycine was confirmed.

TLC analysis condition:
  TLC: Merck, HPTLC-Fertigplatten $NH_2$
  Solvent: 60% acetonitrile
  Detection: diphenylamine/aniline/phosphoric acid/acetone=2:2:15:100
  Reaction product: Rf value at 0.59
  TLC: Merck, Kieselgel 60 F254
  Solvent: chloroform/methanol/water=8:3:1
  Detection: ninhydrin coloring Mass spectrometry:
  Matrix: DHBA (Gentisic acid)
  $[M+Na]^+$: 1,111

EXAMPLE 25

Labeling of amino acid with mono-6-isothiocyanato-6-deoxy-maltosyl-1-cyclodextrin To 1 ml (0.5 mM, pH 9) of aqueous mono-6-isothiocyanato-6-deoxy-maltosyl-β-cyclodextrin solution, 0.1 ml (0.5 mM, pH 9) of aqueous L-phenylalanine solution was added. The resulting mixture was stirred overnight at room temperature. The reaction was monitored by TLC. It was confirmed that the spot due to the isothiocyanato derivative had disappeared and that a new spot had been generated at a position different therefrom. The reaction solution was negative in terms of ninhydrin coloring. The isothiocyanato derivative was combined with the TLC carrier and did not migrate from the origin (since the TLC surface was dried by heating). Also, by mass spectrum, the parent peak of the reaction product formed by the isothiocyanato derivative and phenylalanine was confirmed.

TLC analysis condition:
  TLC: Merck, HPTLC-Fertigplatten $NH_2$
  Solvent: 60% acetonitrile
  Detection: diphenylamine/aniline/phosphoric acid/acetone=2:2:15:100
  Reaction product: Rf value at 0.35
  TLC: Merck, Kieselgel 60 F254
  Solvent: chloroform/methanol/water=8:3:1
  Detection: ninhydrin coloring
  Ninhydrin coloring became negative due to the reaction with isothiocyanato group.
Mass spectrometry:
  Matrix: DHBA (Gentisic acid)
  $[M+Na]^+$: 1,687

EXAMPLE 26

Labeling of amino acid with mono-6-isothiocyanato-6-deoxy-glucosyl-β-cyclodextrin To 1 ml (0.5 mM, pH 9) of aqueous mono-6-isothiocyanato-6-deoxy-glucosyl--β-cyclodextrin solution, 0.1 ml (0.5 mM, pH 9) of aqueous L-phenylalanine solution was added. The resulting mixture was stirred overnight at room temperature. The reaction was monitored by TLC. It was confirmed that the spot due to the isothiocyanato derivative had disappeared and that a new spot had been observed at a position different therefrom. The reaction solution was negative in terms of ninhydrin coloring. Also, by mass spectrum, the parent peak of the reaction product formed by the isothiocyanato derivative and phenylalanine was confirmed.

TLC analysis condition:
  TLC: Merck, HPTLC-Fertigplatten $NH_2$
  Solvent: 60% acetonitrile
  Detection: diphenylamine/aniline/phosphoric acid/acetone=2:2:15:100
  Reaction product: Rf value at 0.35
  TLC: Merck, Kieselgel 60 F254
  Solvent: chloroform/methanol/water=8:3:1
  Detection: ninhydrin coloring
  Ninhydrin coloring became negative due to the reaction with isothiocyanato group.
Mass spectrometry:
  Matrix: DHBA (Gentisic acid)
  $[M+Na]^+$: 1526

EXAMPLE 27

Labeling of insulin with mono-6-isothiocyanato-6-deoxy-γ-cyclodextrin

Figure 24:
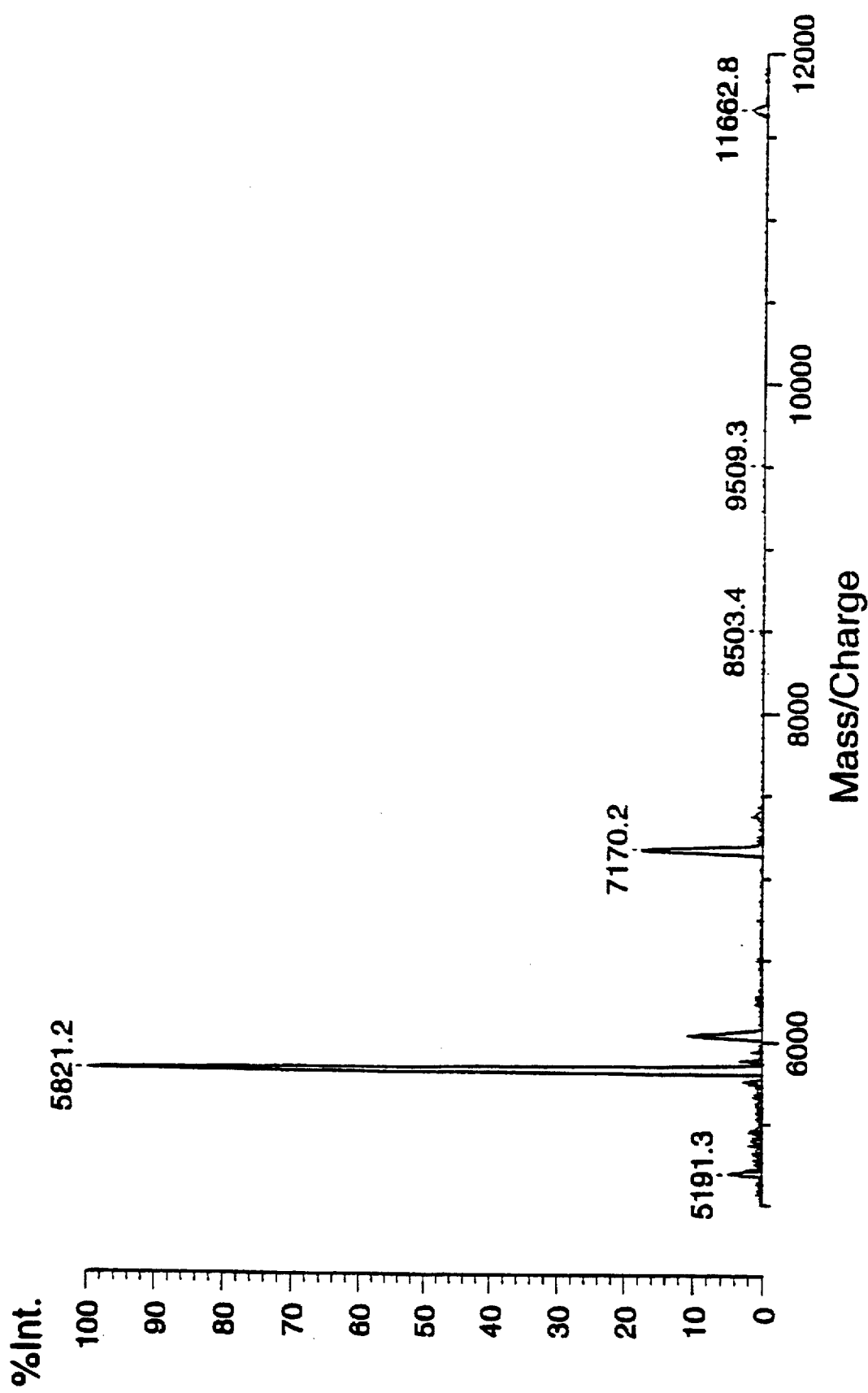
FIG. 24 shows a TOFMS chart of the reaction products of NCS-γ-CD and insulin.

Into 0.01-N HCl, 1 mg of insulin was completely dissolved. Then, the resulting solution was diluted to ⅒ with a buffer of pH 9. Of thus diluted solution, 1 ml was mixed with 20 µl (10 mM) of DMSO solution of mono-6-isothiocyanato-6-deoxy-γ-cyclodextrin. The resulting mixture was stirred for 3 days. When the reaction solution was subjected to TOFMS measurement (See FIG. 24), the parent peak of the labeled insulin was confirmed.

Mass spectrometry:

Matrix: SA (Sinapinic acid)

$|M+Na|^+$: 7170, $|insulin|^+$: 5821, $|insulin-dimer|^+$: 11663

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Applications Nos. 204964/1995 filed on Jul. 8, 1995, and 170972/1996 filed on Jul. 1, 1996 are hereby incorporated by reference.

What is claimed is:

1. A cyclodextrin derivative in which a primary hydroxyl group is substituted by an isothiocyanato group, and wherein the cyclodextrin derivative has only one isothiocyanato group.

2. A compound expressed by general formula (I):

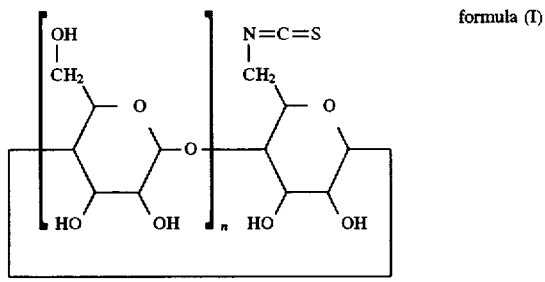

formula (I)

wherein n is an integer from 5 to 7.

3. A compound expressed by formula (II):

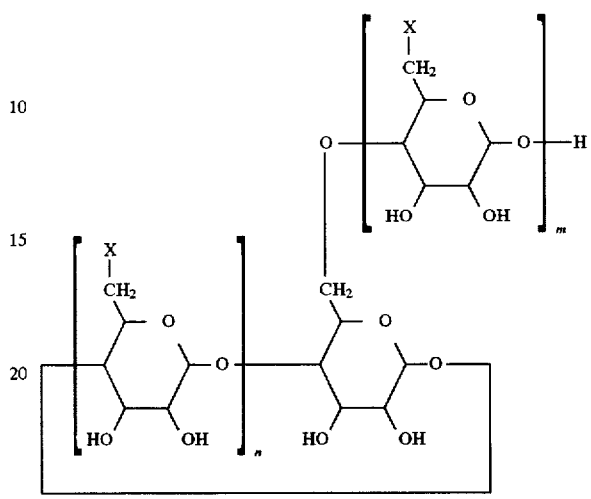

formula (II)

wherein n is an integer from 5 to 7, m is 1 or 2, and X is βH, NCS, $OSO_2C_6H_4CH_3$, $N_3$, or $NH_2$ with the proviso that at least one X is NCS, $OSO_2C_6H_4CH_3$, $N_3$, or $NH_2$.

4. The compound of claim 3 wherein at least one X is NCS.

* * * * *

UNITED STATES PATENT AND TRADEMARK OFFICE
CERTIFICATE OF CORRECTION

PATENT NO. : 5,789,569

DATED : August 4, 1998

INVENTOR(S) : Hiramatsu, et al

It is certified that error appears in the above-identified patent and that said Letters Patent is hereby corrected as shown below:

Column 21, lin 24, delete "general".

Column 22, line 27, change "BH" to --OH--.

Signed and Sealed this

Twenty-fourth Day of August, 1999

Attest:

Q. TODD DICKINSON

Attesting Officer

Acting Commissioner of Patents and Trademarks